United States Patent
May et al.

(10) Patent No.: US 9,949,594 B2
(45) Date of Patent: Apr. 24, 2018

(54) QUICK ASSEMBLY GRILL AND METHOD

(71) Applicant: LightStar Corporation, Dallas, TX (US)

(72) Inventors: Randall L. May, Plano, TX (US); Zhi Bing Gu, Kunshan (CN); Liang Shen, Shanghai (CN); Bin Lin, Shanghai (CN); Wenguan Su, Yangjiang (CN); Lu Liang, Yangjiang (CN); Guolong Chen, Yangjiang (CN)

(73) Assignee: LightStar Corporation, Dallas, TX (US)

( * ) Notice: Subject to any disclaimer, the term of this patent is extended or adjusted under 35 U.S.C. 154(b) by 65 days.

(21) Appl. No.: 14/968,732

(22) Filed: Dec. 14, 2015

(65) Prior Publication Data

US 2016/0166108 A1 Jun. 16, 2016

Related U.S. Application Data

(60) Division of application No. 14/099,755, filed on Dec. 6, 2013, now Pat. No. 9,211,036, which is a
(Continued)

(51) Int. Cl.
*A47J 37/07* (2006.01)

(52) U.S. Cl.
CPC ....... *A47J 37/0763* (2013.01); *A47J 37/0704* (2013.01); *A47J 2037/0777* (2013.01); *Y10T 29/49826* (2015.01)

(58) Field of Classification Search
CPC ................ A47J 37/0704; A47J 37/0763; A47J 2037/0777; Y10T 29/49826
See application file for complete search history.

(56) References Cited

U.S. PATENT DOCUMENTS 4,949,701 A 8/1990 Krosp et al.
5,140,973 A 8/1992 Home
(Continued)

OTHER PUBLICATIONS

Derrick Riches, About.com: Barbeques & Grilling, Sears Kenmore 3-Burner Gas Grill (Model # 16234) by Char-Broil.
(Continued)

*Primary Examiner* — Alfred Basichas
(74) *Attorney, Agent, or Firm* — Sheppard, Mullin, Richter & Hampton LLP

(57) ABSTRACT

The present invention is embodied in a grill configured for quick assembly, a method of partially pre-assembling the grill for shipping from the factory in a container, and a method of assembling the grill when removed from the shipping container. The grill comprises a firebox assembly for mounting on a cart assembly, the cart assembly having first and second support assemblies and at least one linking member interconnecting them. A hinge or pivot in the mid-portion of the linking member divides it into first and second linking member portions, and the opposite ends of the linking member portions are pivotally connected by hinges or the like to the first and second support assemblies. The linking member holds the first and second support assemblies together in a partially pre-assembled state, and the pivotal connections of the linking member portions allow the two assemblies to be folded for packaging in a shipping container. When removed from the container, the pivotal connections of the linking member portions allow the first and second support assemblies to be unfolded, with the linking member holding the two support assemblies in approximately the proper position with respect to each other and to the firebox assembly for assembly of the grill, thus allowing for easier and quicker grill assembly by one person. Alternatively, the linking member can itself be a support
(Continued)

assembly with the first and second support assemblies pivotally attached to opposite ends of the linking member.

10 Claims, 20 Drawing Sheets

Related U.S. Application Data continuation of application No. 13/188,198, filed on Jul. 21, 2011, now Pat. No. 8,602,017, which is a continuation-in-part of application No. 12/707,832, filed on Feb. 18, 2010, now abandoned.

(60) Provisional application No. 61/172,178, filed on Apr. 23, 2009.

(56) References Cited

U.S. PATENT DOCUMENTS

| | | |
|---|---|---|
| 6,257,229 B1 | 7/2001 | Stewart et al. |
| D460,313 S | 7/2002 | Crookshanks et al. |
| 6,443,481 B1 | 9/2002 | Stravitz et al. |
| 6,561,082 B2 | 5/2003 | Gillespie et al. |
| 7,086,395 B1 | 8/2006 | Li |
| 7,328,696 B2 | 2/2008 | Rodriguez |
| 2002/0069865 A1 | 6/2002 | Stewart et al. |
| 2002/0078944 A1 | 6/2002 | Cozzolino et al. |
| 2004/0112363 A1 | 6/2004 | Speck et al. |

OTHER PUBLICATIONS

Sears, Roebuck and Co., Assembly Instructions/Use and Care Manual: Kenmore Liquid Propane Gas Grill, Model No. 415.162340, Feb. 17, 2006.

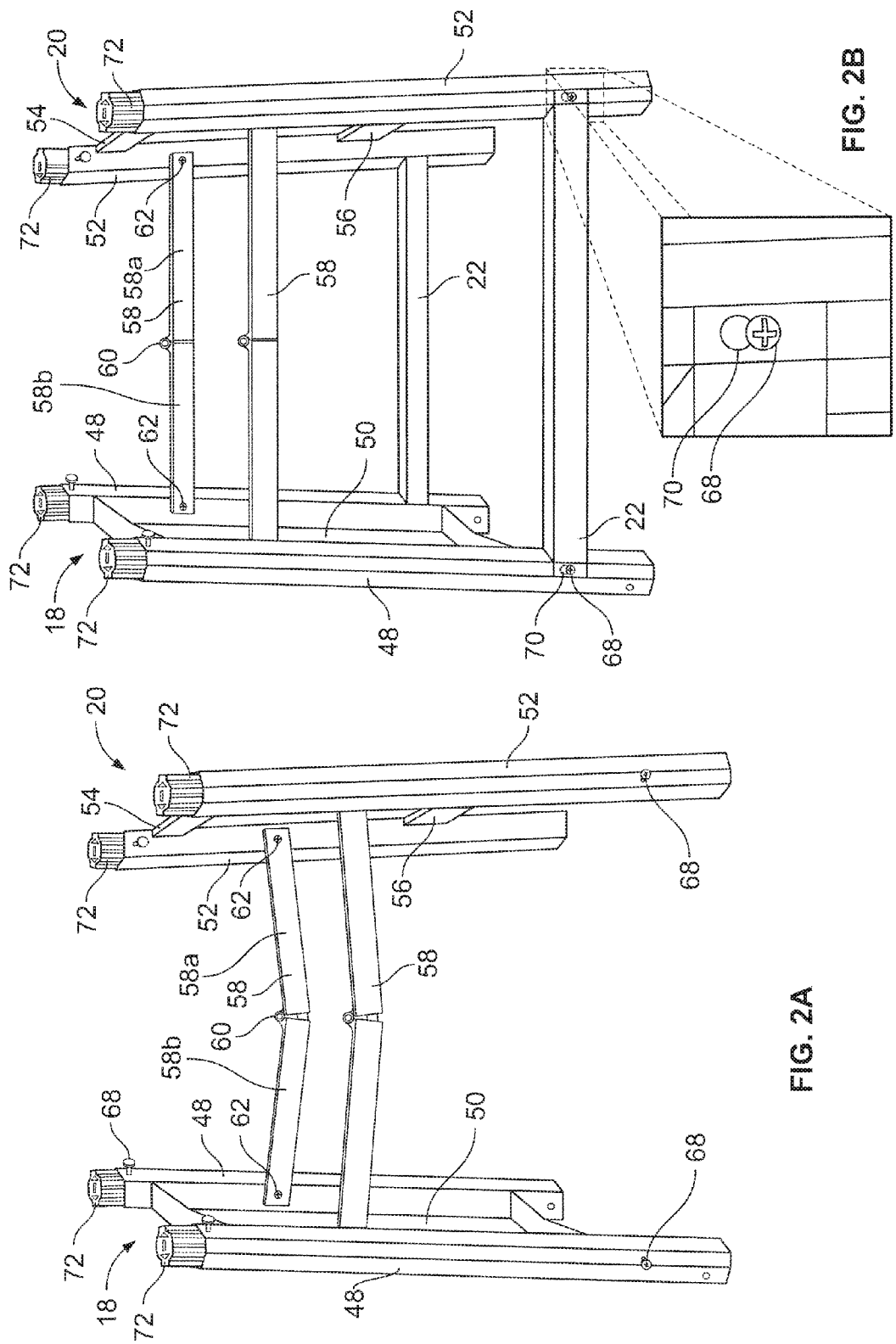

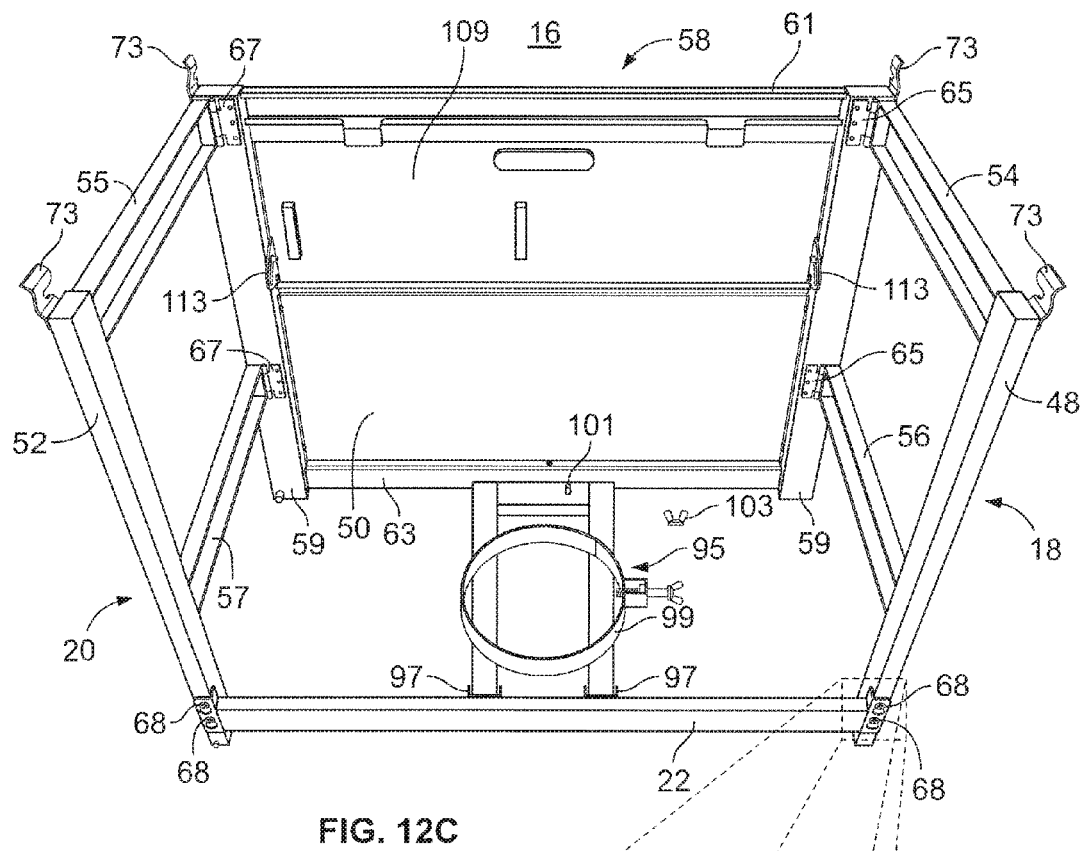
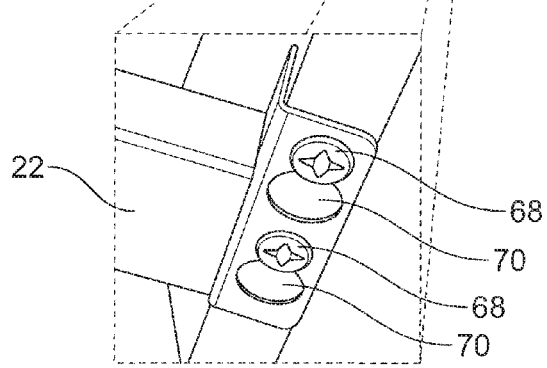
FIG. 12C

QUICK ASSEMBLY GRILL AND METHOD

CROSS-REFERENCE TO RELATED APPLICATION

This is a divisional of U.S. application Ser. No. 14/099,755, filed on Dec. 6, 2013, which is a continuation of U.S. application Ser. No. 13/188,198, filed on Jul. 21, 2011, now U.S. Pat. No. 8,602,017 issued on Dec. 10, 2013, which itself is a continuation-in-part of U.S. application Ser. No. 12/707,832, filed Feb. 18, 2010 which also claims priority to U.S. Provisional Application No. 61/172,178, entitled "Quick Assembly Grill and Method," filed Apr. 23, 2009, the entire contents of which are herein incorporated by reference.

FIELD OF THE INVENTION

This invention pertains generally to the field of grilling appliances and, more particularly, to a grill for quick assembly in stores or by consumers and related methods.

BACKGROUND OF THE INVENTION

Outdoor grilling is a popular way to cook food. Most large grills for use in outdoor cooking include a firebox mounted on a moveable cart. Such carts generally have the firebox located centrally on top of the cart, and they may include one or more shelves below the firebox, a door or doors at the front of the cart, and side panels to at least partially enclose the cart on the sides. Such carts may also include a side shelf on one or both sides positioned approximate the level of the cooking surface. Such carts are typically designed to elevate and support the cooking surface and side shelves at approximately the waist level of an adult. The cart frame typically includes wheels on at least one side so that the grill may be rolled to a convenient location.

Grills are typically distributed to retail stores for purchase by consumers in an unassembled state in cartons. This is because the assembled grill may be several feet tall and several feet wide. Consequently, an assembled grill would normally require a relatively large shipping container, a relatively large amount of warehouse space, and a relatively large amount of retail floor space. The grill's large size can pose a problem for manufacturers transporting the product, and for retailers storing the product, in an assembled condition.

By shipping the grills from the manufacturer to the retailer in an unassembled state, the manufacturer can reduce the size of the shipping container and the retailer can stock more of the product. Since more units may be transported in each shipment, and more units may be kept in the retailer's inventory, this saves money and space.

Retailers often offer to assemble the grill for the consumer for free or for a nominal fee, using the retailer's own employees or an outside service. The cost of assembling a grill for the customer takes away from the retailer's profit on the sale of the grill. Included in the cost is the time needed to train an employee to assemble the grill, and the time needed for the employee to assemble the grill, or the amount paid to the outside service. The more complex the assembly, the longer it takes to train the employee, and the longer it takes the employee, or the outside service, as the case may be, to assemble the product. This translates into higher cost for the retailer.

Additionally, some consumers prefer to assemble the grill themselves. Unfortunately, assembling a grill can be a time-consuming and frustrating exercise, especially if it requires the efforts of multiple people. If the grill is too complicated to be easily assembled by the consumer, then the consumer may refrain from purchasing it. Also, a complex assembly can result in a frustrated customer, leading to reduced customer satisfaction with the product and a loss of repeat business for the manufacturer or retailer.

Accordingly, there is a need for a grill configured for quick assembly that does not suffer from the problems described above. More particularly, there is a need for a grill that can be shipped in a substantially unassembled state and then quickly assembled in the store or at a customer's residence so as to minimize the shipping cost of the unassembled unit and the labor cost related to the assembly. There is also a need for a grill assembly method that reduces the complexity and burden of grill assembly. The present invention satisfies these and other needs, and provides further related advantages.

SUMMARY OF THE INVENTION

The present invention resides in a grill configured for quick assembly, in a method of partially pre-assembling the grill for shipping from the factory in a container, and in a method of assembling the grill when removed from the shipping container.

The quick assembly grill of the present invention comprises a firebox assembly for cooking food and a cart assembly for supporting the firebox assembly. The firebox assembly comprises a firebox assembly including a firebox base and a firebox hood pivotally connected to the firebox base, and a cart assembly for supporting the firebox assembly. The cart assembly comprises first and second support assemblies configured to be joined to the firebox base, and at least one linking member interconnecting the first and second support assemblies, with a first hinge connecting the first support assembly to the linking member and a second hinge connecting the second support assembly to the linking member. The linking member interconnects the first and second support assemblies and holds them together in a partially pre-assembled state so that the two support assemblies can be folded to an unassembled configuration for packaging in a shipping container. The first and second support assemblies can be folded about the first and second hinges respectively to convert the cart assembly from an unassembled configuration, in which the first and second support assemblies are folded, to an assembled configuration, in which the first and second support assemblies are unfolded to a position suitable for supporting the firebox assembly. The linking member cart assembly can be a third support assembly.

The first and second hinges connecting the linking member to the support assemblies may be configured so that the first and second support assemblies does not unfold substantially beyond the assembled configuration that facilitates installation of the firebox assembly on the cart assembly.

The cart assembly may comprise a cart panel or a fold down tray, or both, attached to at least one support assembly or the linking member, or both. The cart assembly may also comprise one or more doors pivotally attached to at least one support assembly or the linking member.

The firebox assembly and/or cart assembly may include partially-inserted threaded fasteners such as bolts or screws when shipped in the shipping container. Various other components in the shipping container intended to be attached to the firebox assembly and/or cart assembly upon assembly of the grill may have keyholes or slotted openings formed in them for quickly attaching the components to the firebox assembly or cart assembly using the partially-inserted fasteners. Such other components may include, for example, cart braces or cross-members, panels, cart shelves, and side tables. The keyholes include a larger opening, sized and configured to be received over the head of a partially-inserted fastener, and a smaller opening, sized and configured to slide underneath and be held by the head of the fastener when it is tightened in place during assembly. Alternatively, slotted openings extend through the edge of a component and are sized and configured to slide underneath and be held by the head of the fastener when it is tightened in place during assembly. This use of partially-inserted fasteners and keyholes and/or slotted openings further allows for easier and quicker assembly of the grill.

One or more shelves or panels, or both, for the cart assembly may be partially pre-assembled with at least one support assembly or linking member, or both, using pivotal connections that allow the shelves and/or panels to be folded into the at least one support assembly and/or the linking member for shipping. When the first and second support assemblies are unfolded and locked into position via the linking member, the shelves and/or panels may then be unfolded from at least one support assembly and/or the linking member into position for permanent attachment thereto.

A cross member may be pivotally attached to the first end of a bottom support assembly. A second opposite end of the bottom support assembly may be attached to the linking member of the cart assembly. The bottom support assembly in this embodiment of the invention may be adapted to support a supply tank.

The grill may include a side burner valve assembly having a partially inserted threaded fastener. The grill also may include a side table having a keyhole opening formed therein to receive the side burner valve assembly's threaded fastener and allow the quick attachment of the side burner valve assembly to the side table.

The present invention also resides in providing the grill configured for quick assembly as described above in the form of a kit. In kit form, all of the components of the grill are packaged in one or more packages or containers for ready removal and assembly by a retailer or consumer.

In one embodiment of the invention, the cart assembly's linking member that interconnects the first and second support assemblies comprises a hinge or pivot in its mid-portion thereby dividing the linking member into first and second linking member portions. In this embodiment, the linking member holds the first and second support assemblies together in a partially pre-assembled state, and the pivotal connections of the linking member portions allow the two assemblies to be folded for packaging in a shipping container. When removed from the container, the pivotal connections of the linking member portions allow the first and second support assemblies to be unfolded, with the linking member holding the two support assemblies in approximately the proper position with respect to each other and to the firebox assembly for assembly of the grill, thus allowing for easier and quicker grill assembly by one person. The linking member may serve merely as a temporary or interim structural member, holding the first and second support assemblies in approximately the proper position while permanent structural members, such as cart braces, cross-members, panels and/or shelves, are installed during assembly. Alternatively, or in addition, the linking member, with or without an appropriate locking mechanism, may itself serve as a permanent structural member, effectively functioning as a third support assembly of the cart assembly.

In another embodiment of the invention, one or more of the pivotal connections of the linking member portions, when unfolded, may be locked in the unfolded state to aid in stabilizing the first and second support assemblies during assembly of the grill. Any suitable locking mechanism may suffice for this purpose, including an interlocking or detent mechanism or an interference or friction fit between the linking member and the first and/or second support assemblies and/or between the first and second linking portions of the linking member itself.

The cart assembly may include two linking members interconnecting the first and second support assemblies of the cart assembly wherein the each linking member has a hinge or pivot in its mid-portion thereby dividing the linking member into first and second linking member portions. The two linking members are spaced apart from one another to better ensure that the two support assemblies are held in approximately the proper position and are substantially stable during assembly of the grill. Each linking member may comprise a linking arm in the form of a cross-member of a frame, with a hinge or pivot in its mid-portion dividing the linking arms into first and second linking arm portions. A locking mechanism may be formed as part of the pivotal connection between the first and second linking arm portions of each linking arm. The linking arms can be temporary structural members and, therefore, may be made of less expensive material such as plastic, as compared to the first and second support assemblies and their permanent structural members, which are typically made of steel or other suitable structural material. Alternatively, the two linking arms may be intended to serve as permanent structural members of the cart assembly. These linking arms may be made of steel or other suitable structural material, and when the linking arm portions of each linking arm are unfolded, they may be locked together by a suitable locking mechanism, such as an angle member that is pivotally connected near the end of one of the linking arm portions and can be pivoted so that it overlaps the end of the other linking arm portion. The angle member may then be locked to the other linking arm portion via a suitable locking mechanism, such as by a spring-loaded pin in the other linking arm portion or the angle member, as the case may be, that is received in a corresponding recess or hole in the other component.

In all of the embodiments in which there is a hinge or pivot in the mid-portion of the linking member, the linking arms are configured preferably to fold upwardly, downwardly or inwardly, rather than outwardly, relative to the assembled configuration of the cart assembly, so that the first and second support assemblies take up minimum space in the shipping carton when folded.

The present invention also resides in a method for partially pre-assembling a grill before shipping for quick assembly after removal from a shipping container. As described above, the grill may comprise a firebox assembly and a cart assembly for supporting the firebox assembly, wherein the cart assembly comprises a first support assembly, a second support assembly, a linking member interconnecting the first and second support assemblies, wherein the linking member can be a third support assembly, a first hinge connecting the first support assembly to the linking member, and a second hinge connecting the second support assembly to the linking member. The partial pre-assembly method includes the steps of interconnecting the first and second support assemblies by a linking member, wherein one end of the linking member is pivotally connected to the first support assembly by a first hinge and the second opposite end of the linking member is pivotally connected to the second support assembly by a second hinge. The method also includes the steps of folding the first and second support assemblies inwardly to a storage configuration resulting in little or no separation between them and packaging at least the folded cart assembly and the firebox assembly in a shipping container.

The method of partially pre-assembling a grill for quick assembly may include the steps of attaching a side cart panel to at least one support assembly or the linking member.

The method of partially pre-assembling a grill for quick assembly also may include the steps of partially inserting at least one threaded fastener into the cart assembly or the firebox assembly before shipping, applying a thread locking compound to the threaded fastener prior to the step of partially inserting the threaded fastener into the cart assembly or the firebox assembly, and forming a keyhole opening in a separate grill component (e.g., cart brace or cross-member, cart panel, cart shelf, or side table) to be attached to the cart assembly or the firebox assembly.

The method of partially pre-assembling a grill for quick assembly further may include the step of pivotally attaching a first end of a bottom support assembly to the cross-member by a hinge, and partially inserting at least one threaded fastener into a second opposite end of the bottom support assembly.

In the method for partially pre-assembling a grill for quick assembly where the grill comprises at least one linking member having two linking member portions pivotally connected together, the method includes the step of interconnecting the first and second support assemblies by at least one linking member, the linking member having a first linking member portion pivotally connected to the first support assembly and a second linking member portion pivotally connected to the second support assembly, with the two linking member portions pivotally connected together. The method includes the further steps of folding the cart assembly into a compact storage configuration, and packaging the folded cart assembly in a shipping container together with the firebox assembly and selected other components of the grill.

The present invention also resides in a method for assembling a grill configured for quick assembly after removal from a shipping container, the grill comprising a firebox assembly and a cart assembly for supporting the firebox assembly, wherein the cart assembly comprises a first support assembly, a second support assembly, a linking member interconnecting the first and second support assemblies, wherein the linking member can be a third support assembly, a first hinge connecting the first support assembly to the linking member, and a second hinge connecting the second support assembly to the linking member. The method includes the steps of removing the firebox assembly and the cart assembly from the shipping container, unfolding the first and second support assemblies of the cart assembly so that the first and second support assemblies are in a position suitable for supporting the firebox assembly, and securing the firebox assembly to the cart assembly.

A further aspect of the method for quick assembly of a grill configured for quick assembly can include the steps of aligning a keyhole opening formed in a grill component to be attached to the grill with a threaded fastener partially pre-inserted into the cart assembly or the firebox assembly, wherein the keyhole opening comprises a larger opening, sized and configured to receive a head of the threaded fastener, and a smaller opening, contiguous with the larger opening, and sized and configured to be slid under the head and around the shaft of a threaded fastener, sliding the component with respect to the grill so that the head of the threaded fastener extends over the smaller opening, and tightening the threaded fastener.

Another aspect of the method for quick assembly of a grill configured for quick assembly can include the steps for attaching a cross-member pivotally attached to a first end of a bottom support assembly by aligning the keyholes in a first end and second end of the cross-member over the treaded fastener pre-inserted into the first and second support assemblies respectively, sliding the cross-member so that the threaded fasteners in the first and second support assemblies extend over the smaller openings in the keyholes of the first and second ends of the cross-member, and tightening the threaded fasteners. The bottom support assembly is then unfolded so a threaded fastener pre-inserted into a second end of the bottom support assembly aligns with an aperture in the linking member and tightening the threaded fastener.

Where the grill comprises a linking member having a first linking member portion pivotally connected to the first support assembly and a second linking member portion pivotally connected to the second support assembly, with the two linking portions pivotally connected together, the quick assembly method includes the steps (not necessarily in order) of removing the firebox assembly and cart assembly from the shipping carton; unfolding the first and second support assemblies of the cart assembly, with the linking member holding the first and second support assemblies in approximately the proper position with respect to each other and to the firebox assembly for assembly of the grill; locking the first and/or second linking member portions of the linking member; and securing the firebox assembly to the cart assembly. The method also may include the step of securing permanent structural members to the first and second support assemblies of the cart. The method may further include the steps of aligning a keyhole or slotted opening formed in a component to be attached to the grill with a threaded fastener partially inserted in the firebox assembly and/or first and second support assemblies of the cart, as the case may be, prior to shipping; sliding the component into position so that the head of the threaded fastener is received in the keyhole or slotted opening so as to engage the component; and tightening the threaded fastener.

Other features and advantages of the invention will be apparent from the following detailed description of the preferred embodiments taken in conjunction with the accompanying drawings, which illustrate, by way of example, the principles of the invention.

BRIEF DESCRIPTION OF THE DRAWINGS

Various embodiments of the present invention will now be described, by way of example only, with reference to the following drawings, in which:

FIG. 2A is a side elevation view of the support assemblies of FIG. 1 showing a pair of temporary linking arms joining them together in a partially unfolded state.

FIG. 2B is a side elevation view of the support assemblies and linking arms shown in FIG. 2A in the fully unfolded state, with the linking arms locked and the cross-members permanently secured in place, including an enlarged fragmentary view showing a keyholes in one of the cross-members received over a threaded fastener in a leg of one of the support assemblies.

FIG. 12C is the side elevation view of the fully unfolded support assemblies and the linking member shown in FIG. 12B in the state, with a cross-member secured in place, and where the bottom support assembly, which is pivotally attached to the cross-member, is unfolded and removably attached to the linking member.

DETAILED DESCRIPTION OF THE PREFERRED EMBODIMENTS

Figure 1:
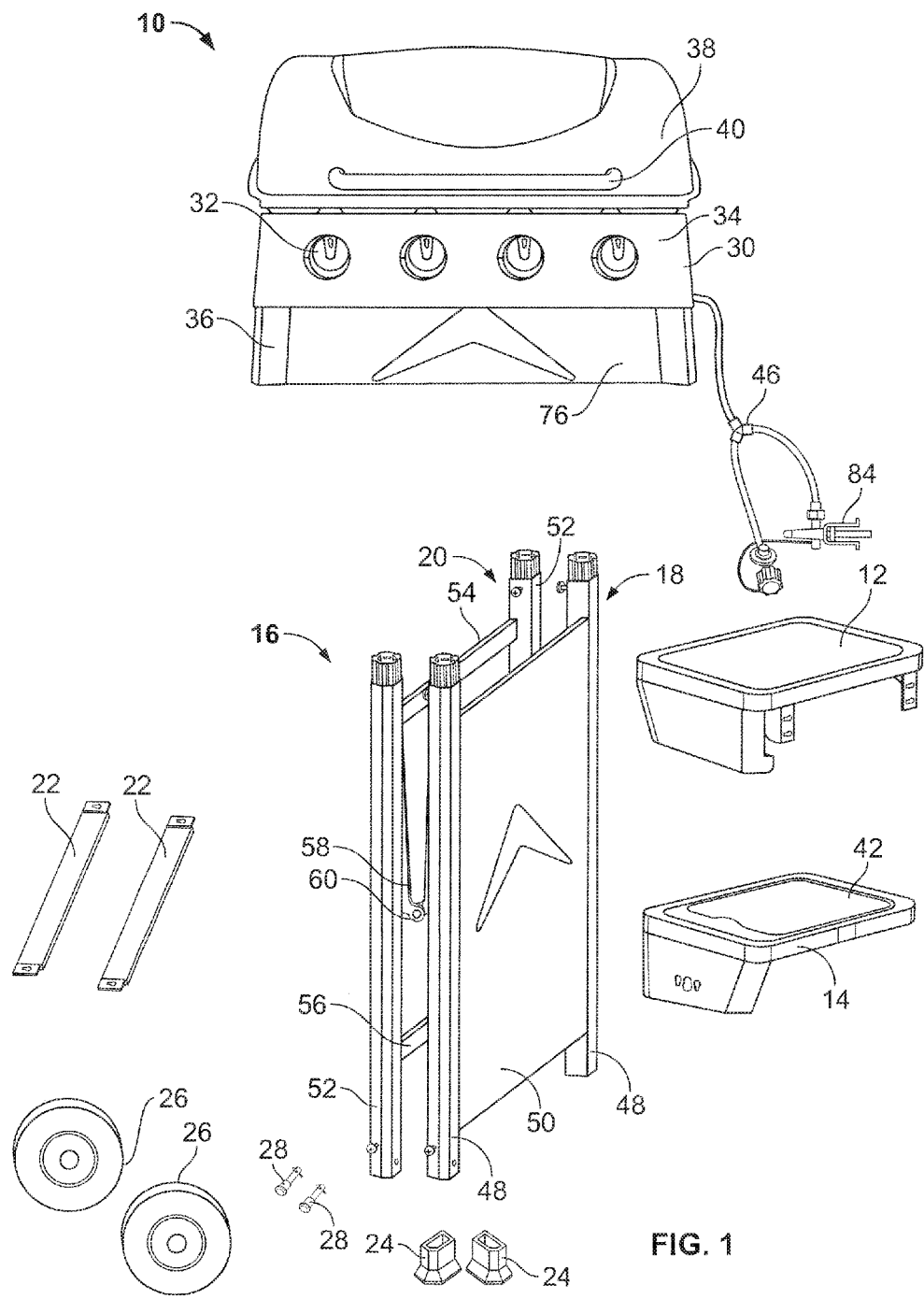
FIG. 1 is an exploded view showing various individual components of a grill that may be packaged in a shipping container in accordance with the present invention, including a fire box assembly having a hose assembly for connecting to a fuel tank and a side burner, a pair of side tables, a pair of support assemblies for a cart assembly folded together for shipping, a pair of cross-members, a pair of feet, a pair of wheels, and a pair of hitch pins for the wheels.

Referring now to the drawings, and particularly to FIG. 1 thereof, a typical set of components of a grill that may be packaged in a shipping container in accordance with the present invention are shown. The components of the grill include a firebox assembly 10, a pair of side tables 12 and 14, and a cart assembly comprising a front and rear support assemblies 18 and 20, respectively, a pair of cross-members 22, a pair of feet 24, a pair of wheels 26, and a pair of hitch pins 28 for mounting the wheels.

The firebox assembly 10 comprises a firebox base 30 for the valves, burners and grills (not shown) typically employed for applying heat to the food. As shown, the firebox base has burner control knobs 32 on a front panel 34 and a base support 36 for supporting it on top of the cart assembly at approximately the waist level of a typical adult, and a firebox hood 38 with a handle 40 for selectively covering and uncovering the firebox base. The firebox hood is appropriately hinged to the firebox base (not shown) to allow the hood to be opened and closed, as is well known in the art. One of the side tables 14 also has a valve, burner and grill or the like (not shown), covered by a hinged lid 42, with a control knob 44 (FIG. 6) at the front. The firebox assembly also comes with a hose assembly 46 for connecting a supply tank (not shown) to the valves and burners in the firebox base and to the valve and burner in the side table.

The front support assembly 18 comprises a pair of legs 48 held in spaced-apart relationship by a front panel 50, and the rear assembly comprise a similar pair of legs 52 held in spaced-apart relationship by upper and lower cross-members 54 and 56, respectively. The front panel serves both an aesthetic purpose and to add structural rigidity to the front support assembly. Preferably all of the legs are tubular, and the legs, the front panel and the upper and lower cross-members are made of steel or other suitable structural material. The front panel is fastened by threaded fasteners to the legs of the front support assembly, and the upper and lower cross-members are spot-welded to the legs of the rear support assembly, though the front panel and cross-members can be attached in any other suitable manner.

As seen in FIG. 1, the support assemblies 18 and 20 are packaged in the shipping carton folded together so as to be relatively flat and compact. To this end, as shown in FIGS. 2A and 2B, the two support assemblies are partially pre-assembled by interconnecting them with a pair of linking arms 58 that extend between opposing pairs of legs on the support assemblies. A hinge 60 in the mid-portion of each linking arm divides it into first and second linking arm portions 58a and 58b. The opposite ends of each linking arm are pivotally connected by pins or screws 62 to the inside surface of a leg. As a result, the linking arms are capable of folding onto themselves. The pins of the hinges are located at the top of the linking arms so that the linking arms fold downward, though they could be designed to fold upward or inward. When completely folded, each linking arm is received along the insides of the opposing legs to which it is pivotally connected, allowing the two support assemblies to collapse together with little or no separation between them, thus minimizing space in the shipping carton.

When the support assemblies 18 and 20 are removed from the shipping carton, they can be unfolded by the assembler as shown in FIG. 2A. When completely unfolded as shown in FIG. 2B, the linking arms 58 will position the support assemblies in approximately the proper position for further assembly of the grill. In this regard, it should be noted that the linking arms in this first embodiment of the invention are not intended to be permanent structural elements of the completely assembled grill. Rather, the linking arms are only intended to quickly and properly position the two support assemblies and hold them sufficiently steady in the front-rear direction so that an assembler, working alone, can readily attach other components without need of an assistant. Therefore, the linking arms can be made of less expensive material such as plastic.

Figure 3A:
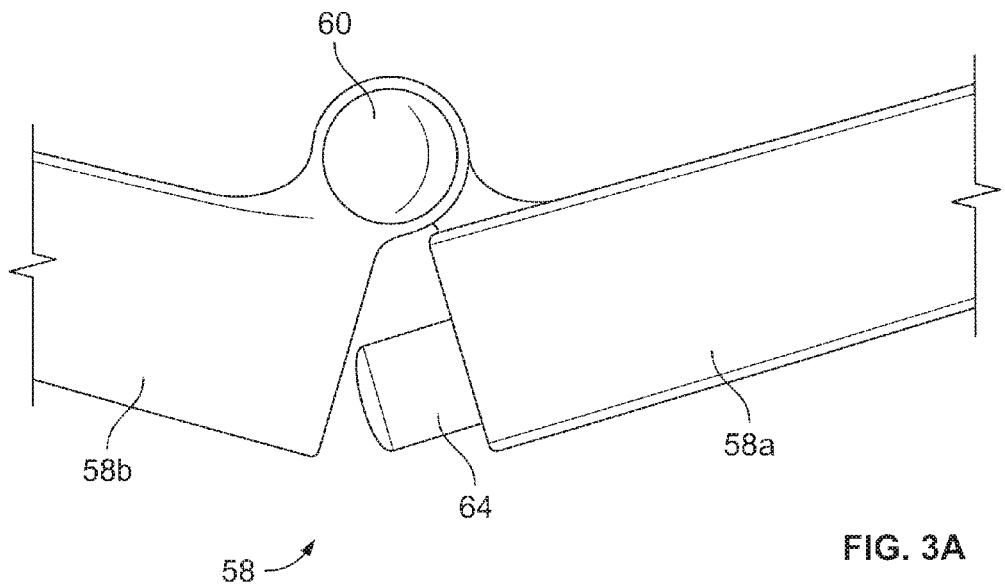
FIG. 3A is an enlarged fragmentary side view of one of the partially unfolded linking arms of FIG. 2A.
Figure 3B:
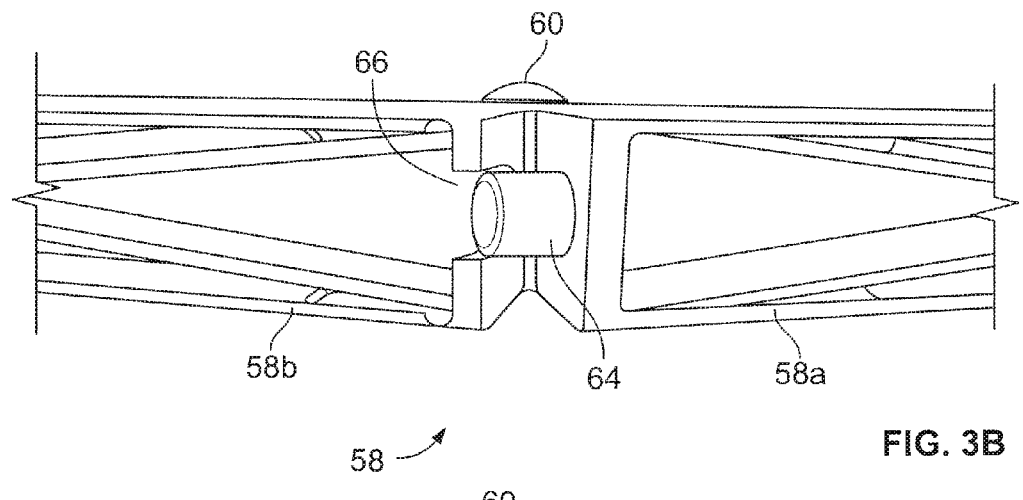
FIG. 3B is an enlarged fragmentary bottom view of one of the partially unfolded linking arm of FIG. 2A.
Figure 3C:
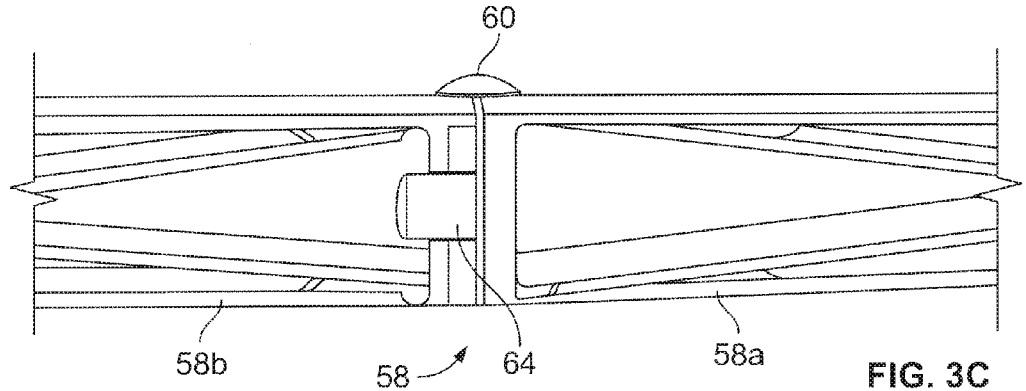
FIG. 3C is an enlarged fragmentary bottom view of one of the locked linking arms of FIG. 2B.

To help ensure that the linking arms 58 hold the support assemblies in the proper position while the assembler attaches other components, each linking arm is provided with a locking mechanism at or near its hinge 60. As shown in FIGS. 3A-3C, the locking mechanism comprises a cylindrical protrusion 64 formed in the end of one linking arm portion 58a that mates with a complementary recess 66 formed in the abutting end of the other linking arm portion 58b. The protrusion and the recess are sized to mate with an interference fit to lock the two linking arm portions together, though persons of ordinary skill will appreciate that other locking schemes could be used. Alternatively, or in addition, suitable locking mechanisms could be employed where the linking arms pivotally connect to the legs of the support assemblies. Where the linking arms are not intended to serve as permanent structural members, the locking mechanisms need not be very robust, but only sufficient to hold the support assemblies steady while the assembler attaches other, permanent structural components such as the cross-members 22.

Once the support assemblies 18 and 20 are completely unfolded, the assembler can attach the permanent cross-members 22 to opposing legs 48 and 52 of the two support assemblies to permanently lock them in the proper position. In order to make this process quicker and easier, as shown in FIG. 2B the support assemblies are shipped with threaded fasteners 68 for attaching the cross-members that have been partially threaded in place in threaded holes formed in the legs. These threaded fasteners are preferably held in place with a common thread locking compound, such as LOC-TITE®, to prevent the fasteners from falling out due to vibration during transit, while still allowing the fasteners to be tightened during grill assembly. In addition, vertically-oriented keyholes 70 are formed in the ends of the cross-members to mate with the fasteners. The larger openings of the keyholes are sized to be received over the heads of the threaded fasteners without having to remove them, and the smaller openings of the keyholes are sized to slide around the threaded shafts of the fasteners, underneath the fastener heads. Once the keyholes in the cross-members are placed over the fastener heads and slid into place, the fasteners can be tightened to secure the cross-members to the legs as shown in the enlarged fragmentary view in FIG. 2B.

Figure 4:
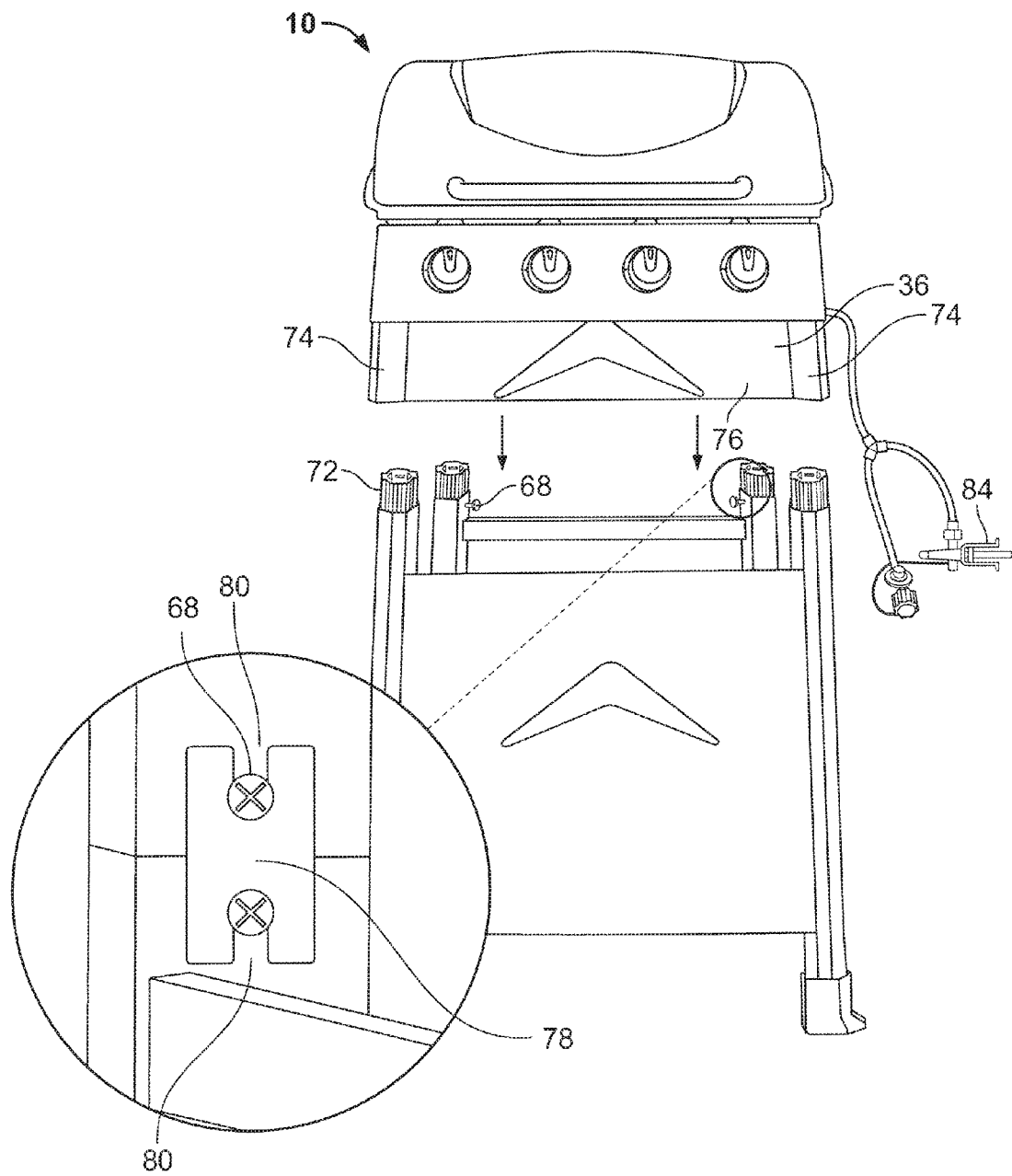
FIG. 4 is an exploded front elevation view showing a method of mounting the firebox assembly on the cart assembly, including an enlarged fragmentary view showing a bracket with slotted openings and fasteners for securing the firebox assembly to the cart assembly.

With the cross-members 22 secured in place, the assembler can then install the feet 24 on the legs on one side of the support assemblies 18 and 20, and the wheels 26 using the hitch pins 28 inserted through holes on the legs on the other side the support assemblies (FIG. 4).

Still referring to FIG. 4, the firebox assembly can now be installed on the cart assembly. To this end, a connector block 72 is sized and shaped to fit into the end of each of the legs of the support assemblies, with a portion of each connector block protruding out of the end of the legs. The base support 36 of the firebox assembly 10 has four downward extending tubular stub legs 74 that align with the legs of the support assemblies. A front stub panel 76 extends between the tubular stub legs of the base support. The protruding ends of the connector blocks are sized and shaped to be received in open ends of the tubular stub legs of the base support. The connector blocks can be secured to the legs of the support assemblies and to the stub legs of the base support by threaded fasteners inserted through the walls of the legs and the stubs into the connector blocks (not shown).

In addition, or in the alternative, the firebox assembly can be secured to the cart assembly by brackets 78 held in place by threaded fasteners received in slotted openings 80 in the brackets, such as shown in the enlarged illustration in FIG. 4.

Figure 5:
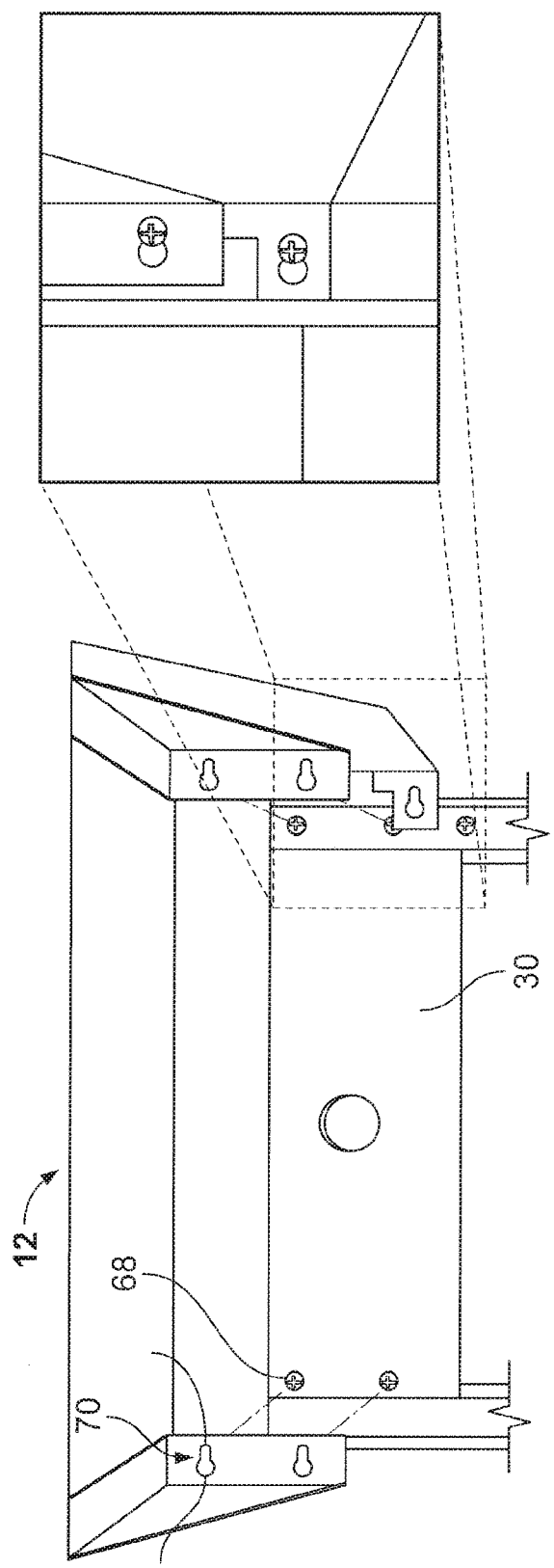
FIG. 5 is a fragmentary side view of the firebox assembly of FIG. 4, showing a method of attaching a side table thereto using fasteners partially threaded in place, including an enlarged fragmentary view showing keyholes formed in the side table received over the fasteners, thereby securing the side table to the firebox assembly.
Figure 6:
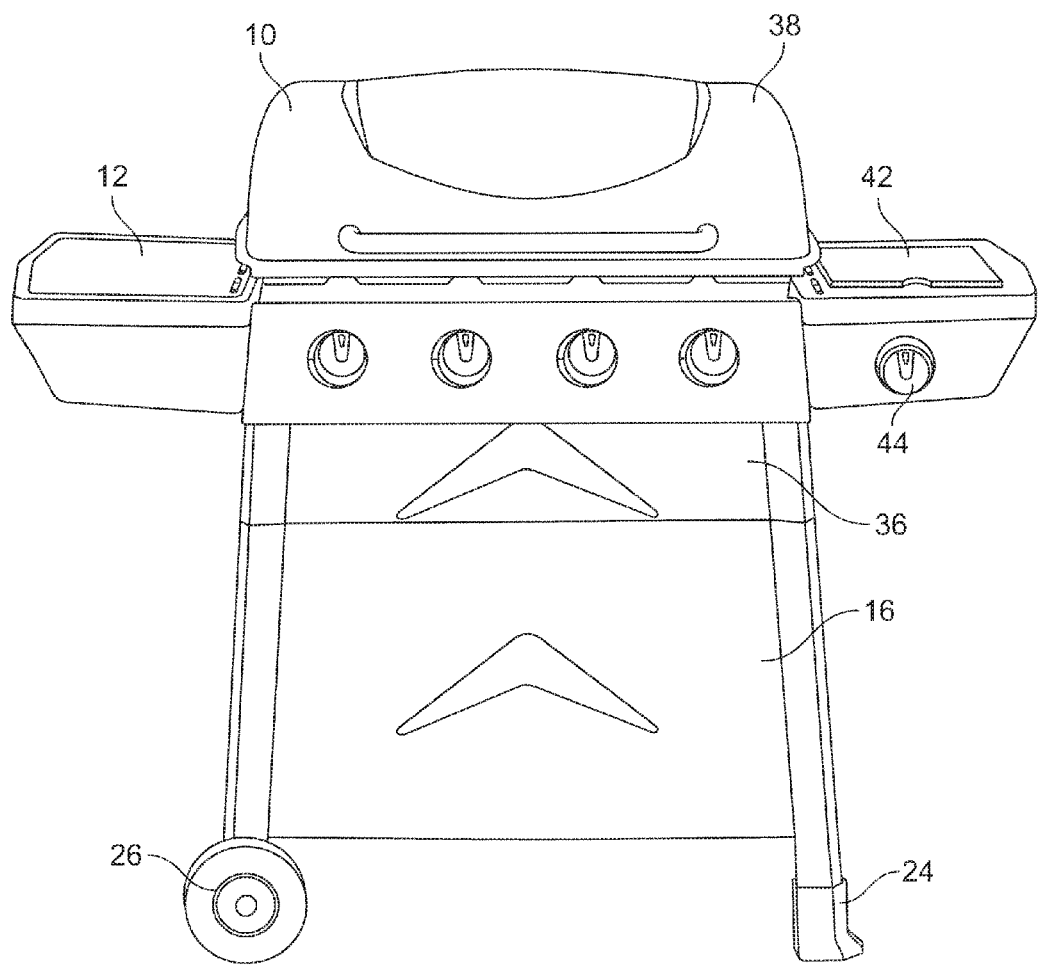
FIG. 6 is a front elevation view of the assembled grill of FIG. 1.

FIG. 5 illustrates attachment of one of the side tables 12 to the side of the fire box assembly 10. Preferably the firebox base 30 is shipped with threaded fasteners partially threaded into holes for attaching the side tables. The side table includes keyhole openings 70 that are sized and positioned to receive the fasteners. To install the side table, the assembler aligns each keyhole with its respective fastener so that the heads of the fasteners are received through the larger openings of the keyholes. The assembler then slides the side table so that the smaller openings of the keyholes are received underneath the fastener heads and then tightens the fasteners. The other side table 14 may be installed in a similar manner. The completely assembled grill is shown in FIG. 6.

Figure 6A:
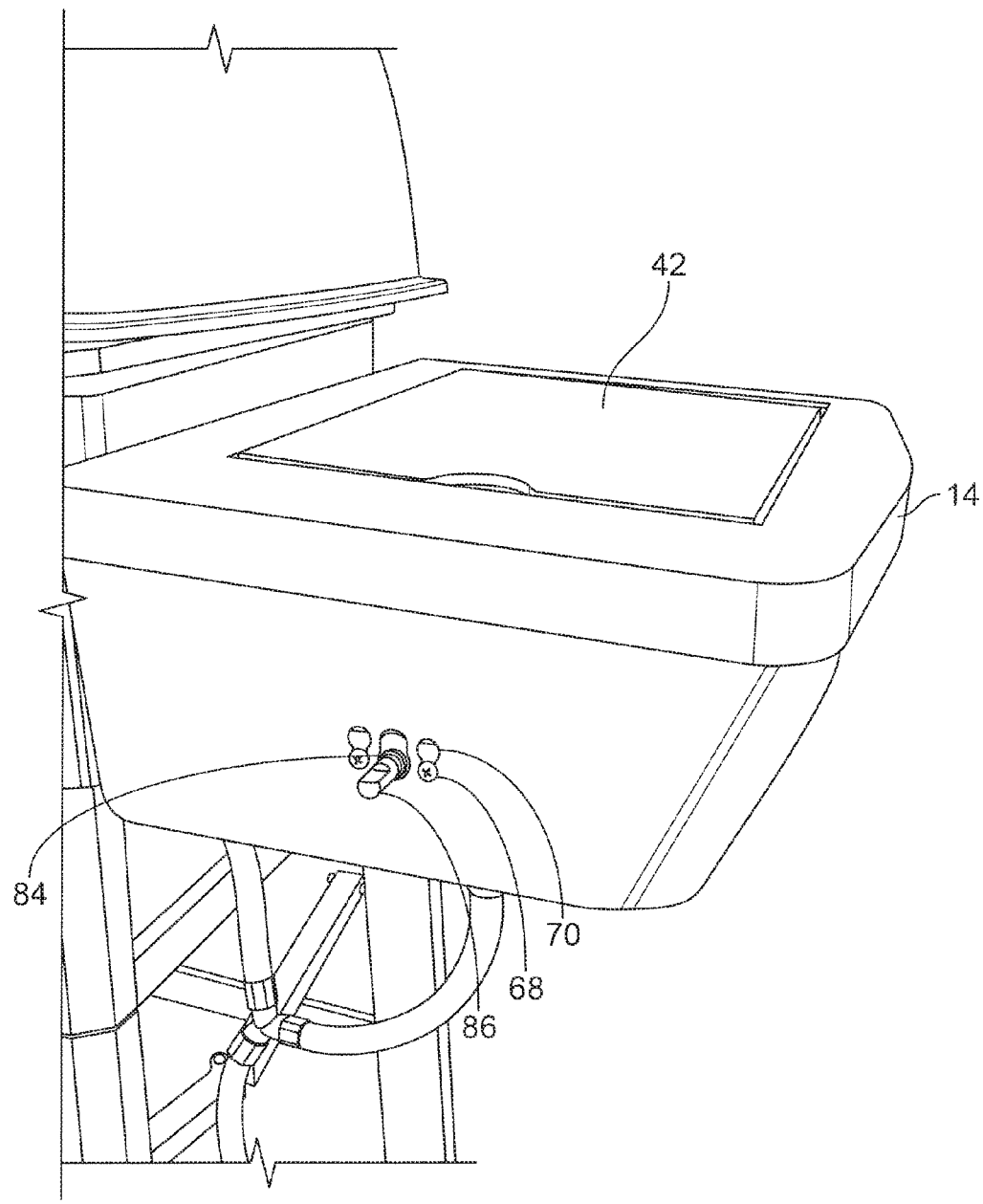
FIG. 6A is a side elevation view of a side table for the firebox assembly of FIG. 4, showing a method of attaching a side burner valve assembly thereto using fasteners partially threaded in place and keyholes formed in the side table to receive the fasteners, thereby securing the side burner valve assembly to the side table.
Figure 6B:
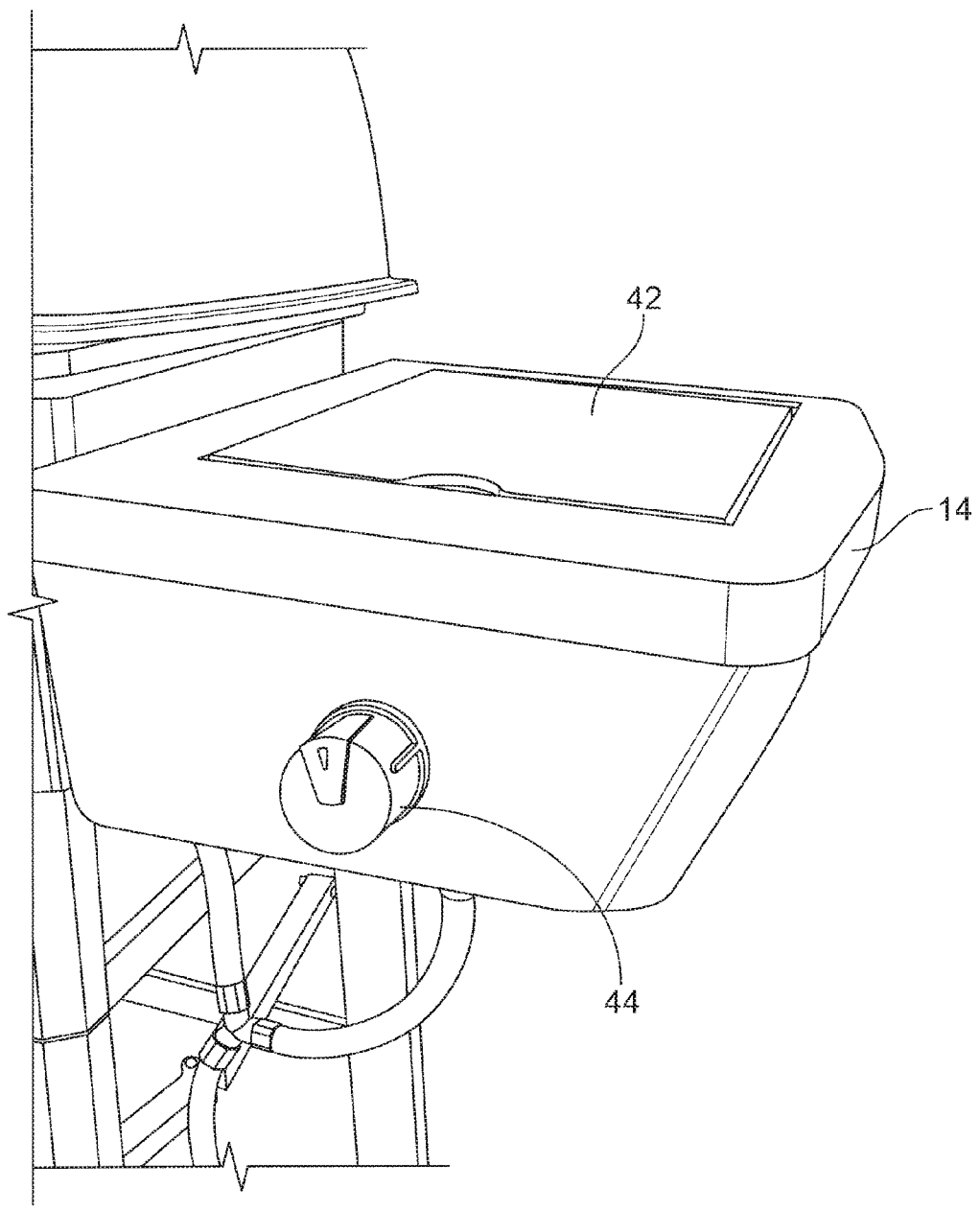
FIG. 6B is a side elevation view of the side table of FIG. 6A having a side burner control knob in place.

As noted, one of the side tables may include a side burner assembly (not shown). FIG. 6A illustrates attachment of a valve 84 for the side burner assembly to the side table. Preferably the valve is shipped with threaded fasteners partially threaded into holes for attaching the valve to the side table. The side table includes an opening to receive the valve stem 86 of the valve and keyhole openings 70 that are sized and positioned to receive the fasteners that have been pre-inserted in the valve. To install the valve, the assembler passes the valve stem and the fasteners through their respective openings in the side table so that the heads of the fasteners are received through the larger openings of the keyholes. The assembler then slides the valve so that fastener heads are received over the smaller openings of the keyholes and tightens the fasteners. Once the side burner valve is in place, the assembler can install the burner control knob 44 onto the valve stem, as shown in FIG. 6B.

Figure 7A:
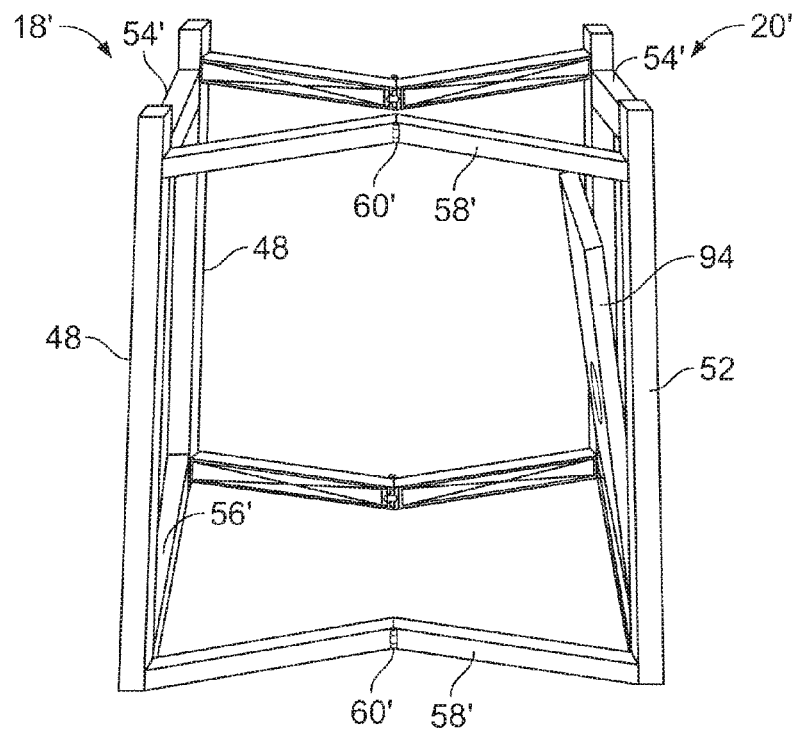
FIG. 7A is a side elevation view of alternative support assemblies and linking arms for a cart assembly in a partially unfolded state, with a bottom shelf pivotally attached to one of the support assemblies.
Figure 7B:
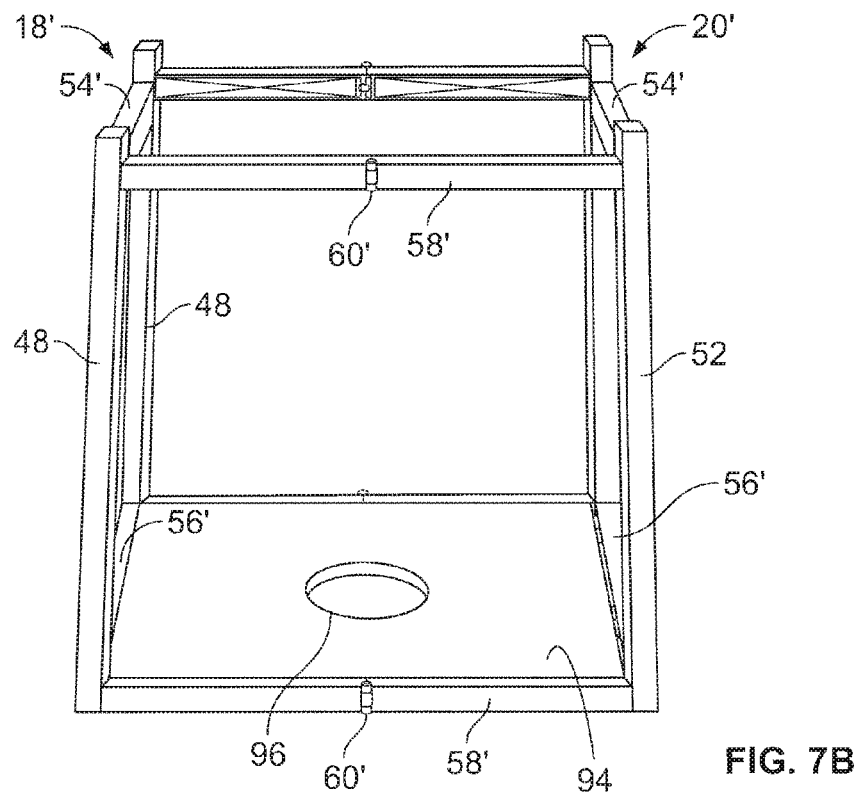
FIG. 7B is a side elevation view of the alternative embodiment shown in FIG. 7A in the fully unfolded state, with the linking arms locked and the bottom shelf permanently secured in place.

An alternative embodiment of the support assemblies for the cart is shown in FIGS. 7A and 7B. In this embodiment, the front and rear support assemblies 18' and 20', respectively, each again comprise a pair of legs 48' and 52', respectively, held in spaced apart relationship by upper and lower cross-members 54' and 56', and the two support assemblies are likewise partially pre-assembled by interconnecting them with a pair of linking arms 58' that extend between opposing pairs of legs on the support assemblies. Similarly, a hinge 60' in the mid-portion of each linking arm divides it into first and second linking arm portions 58a' and 58b', and the opposite ends of each linking arm are pivotally connected to opposing legs of the support assemblies. The primary difference is that the linking arms are hinged to fold inward, rather than downward as in the embodiment shown in FIGS. 2A and 2B. As in FIGS. 2A and 2B, these linking arms in this embodiment are not intended to be permanent structural elements of the completely assembled grill, but rather are only intended to position the two support assemblies and hold them sufficiently steady while the assembler attaches other components. Therefore the linking arms can be formed of less expensive material such as plastic, as in FIGS. 2A and 2B. Castors (not shown) can be installed in the bottom of each leg.

Figure 8A:
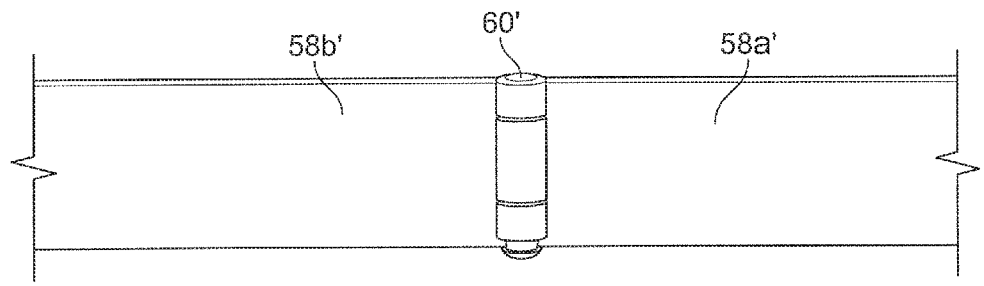
FIG. 8A is a fragmentary side view of an alternative embodiment of the partially unfolded linking arm of the support assemblies shown in FIGS. 7A-7B.
Figure 8B:
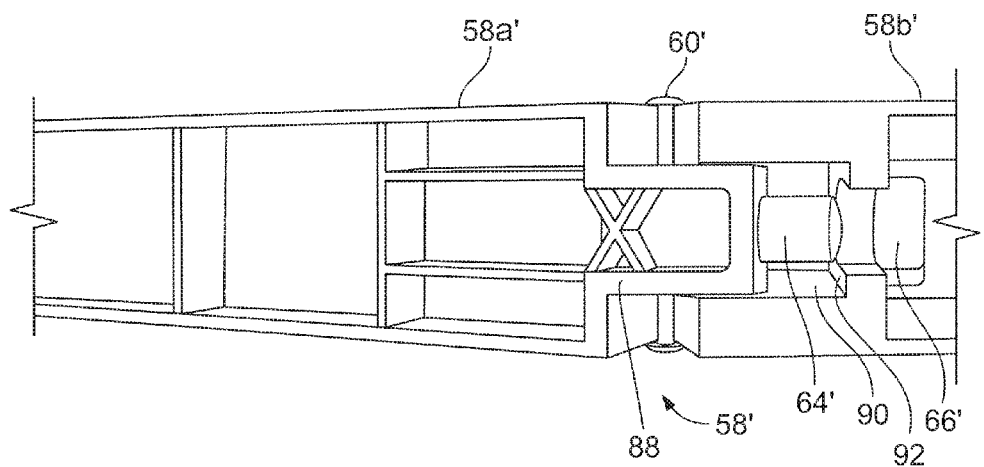
FIG. 8B is a fragmentary view from the opposite side of the partially unfolded linking arm shown in FIG. 8A.
Figure 8C:
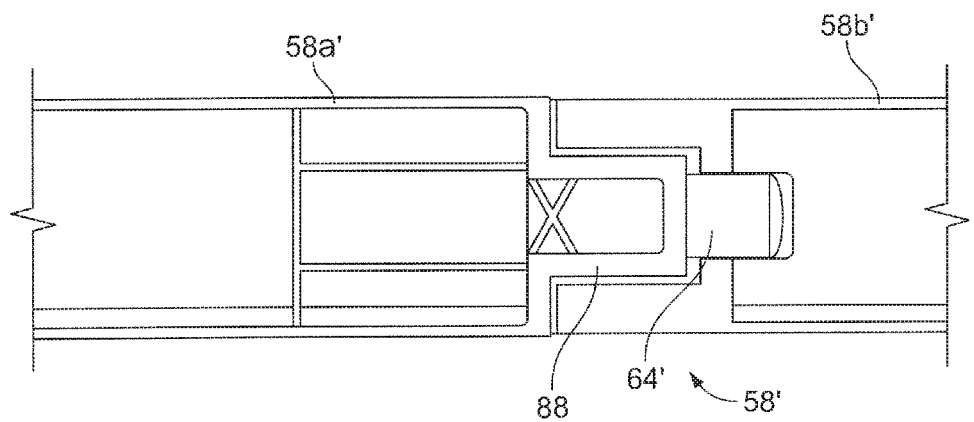
FIG. 8C is a fragmentary view similar to FIG. 8B showing the linking arm in a fully unfolded and locked state.

With reference to FIGS. 8A-8C, each linking arm 58' further includes a locking mechanism near the hinge 60' similar to the locking mechanism shown in FIGS. 3A-3C. In this case, the locking mechanism is formed on the rear side of the linking arms and the two linking arm portions 58a' and 58b' are designed to overlap at the hinge for great structural integrity. In this regard, at the hinge, the end of one linking arm portion 58a' is formed with a rectangular extension 88 that is received with a relatively tight fit in a complementary rectangular recess 90 formed in the other linking arm portion 58b'. As a result of this overlap, the linking arm is more rigid in the vertical direction when completely unfolded and locked. In addition, a cylindrical protrusion 64' is formed on the end of the rectangular extension that mates with a complementary recess 66' formed in the end wall 92 of the rectangular recess. Similar to FIGS. 3A-3C, the protrusion and the recess are sized to mate with an interference fit to effect locking.

Referring again to FIG. 7A, a bottom shelf 94 is pivotally connected as by a hinge or the like along its rear edge to the lower cross-member (not shown) of the rear support assembly 20'. This allows the bottom shelf to be folded into the rear support assembly for compactness when the two support assemblies 18' and 20' are folded together for shipping. After the support assemblies are unfolded and the linking arms 58' are locked in position, the assembler can fold the bottom shelf down into position and secure it by fasteners (not shown) to the lower cross-member 56' or to the legs 50' of the front support assembly. As shown, the bottom shelf includes a relatively large circular opening 96 for holding a supply tank.

Figure 9A:
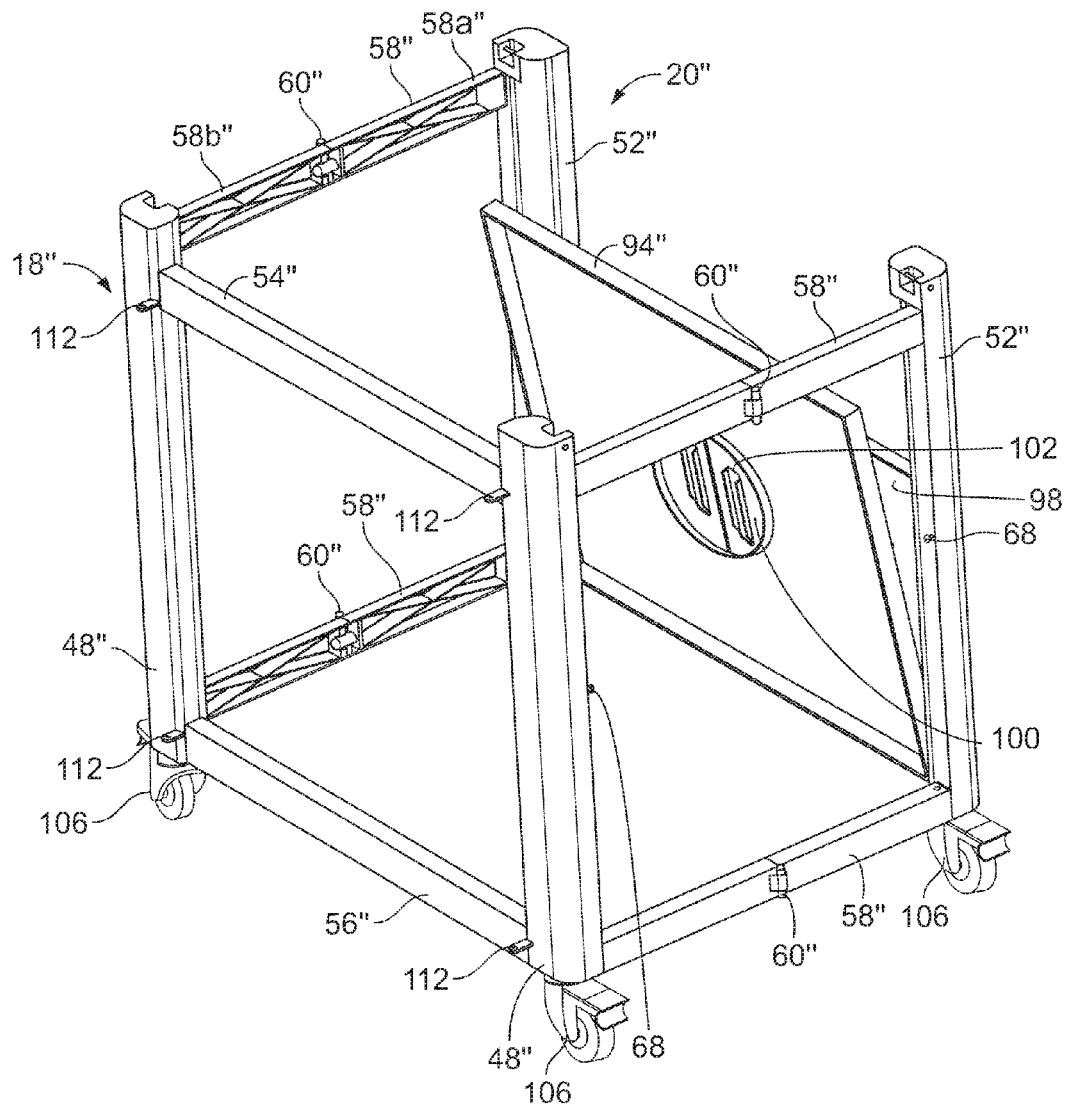
FIG. 9A is a perspective view of an alternative embodiment of a cart assembly in accordance with the present invention, having a rear panel permanently secured in place on one of the support assemblies, a bottom-shelf pivotally attached to such support assembly, and a pair of side panels pivotally attached to the bottom shelf.
Figure 9B:
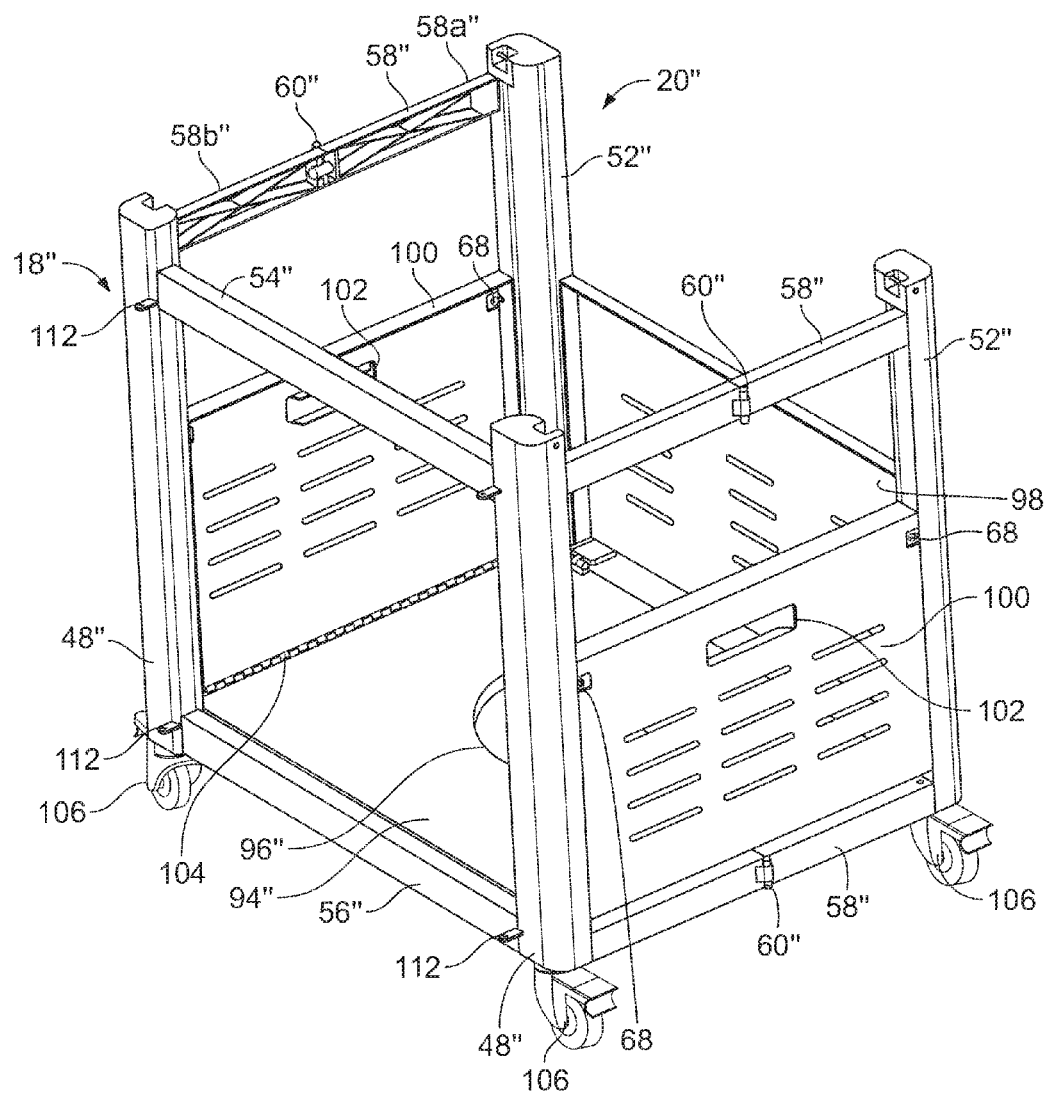
FIG. 9B is a perspective view of the alternative embodiment of the cart assembly shown in FIG. 9A in the fully unfolded state, with the bottom shelf and side panels unfolded and permanently secured in place.
Figure 9C:
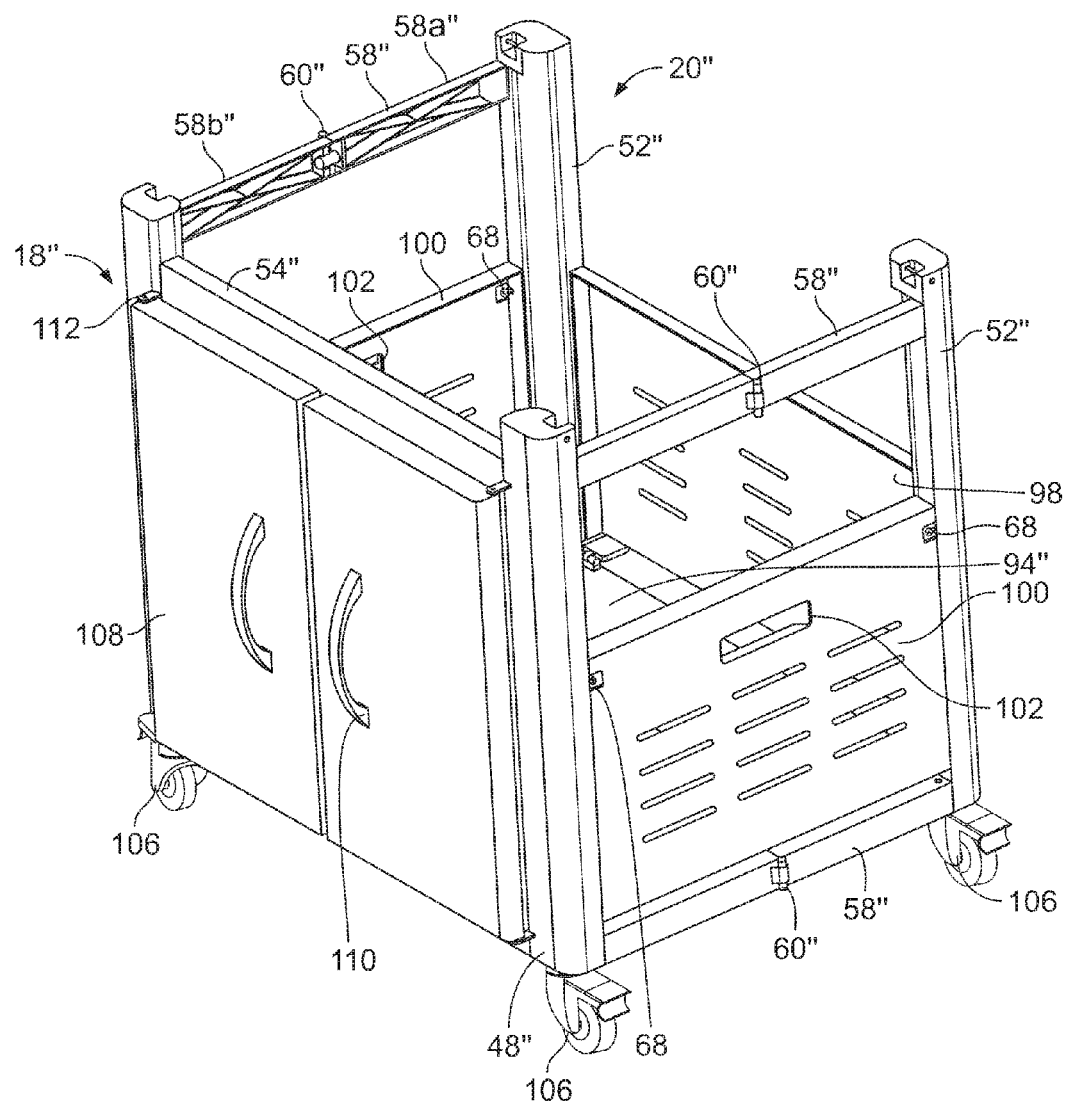
FIG. 9C is a perspective view of the alternative embodiment of the cart assembly shown in FIG. 9B with a pair of doors mounted on the front of the cart assembly.
Figure 10A:
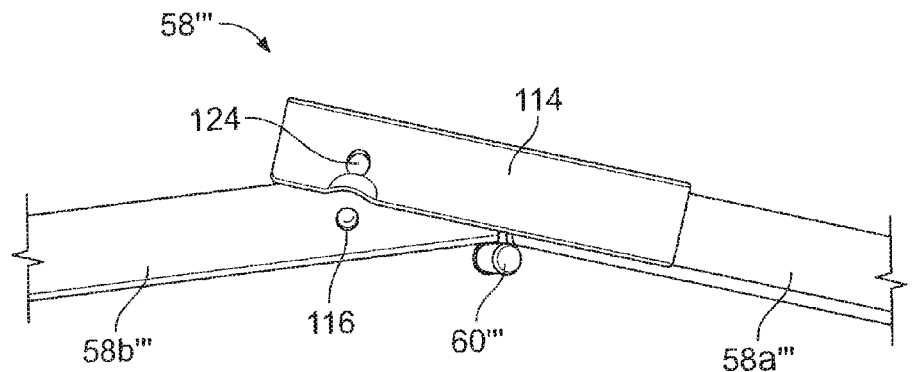
FIG. 10A is a fragmentary top view of an alternative linking arm and locking mechanism in a partially unfolded state for the support assemblies shown in FIGS. 7A-7B.
Figure 10B:
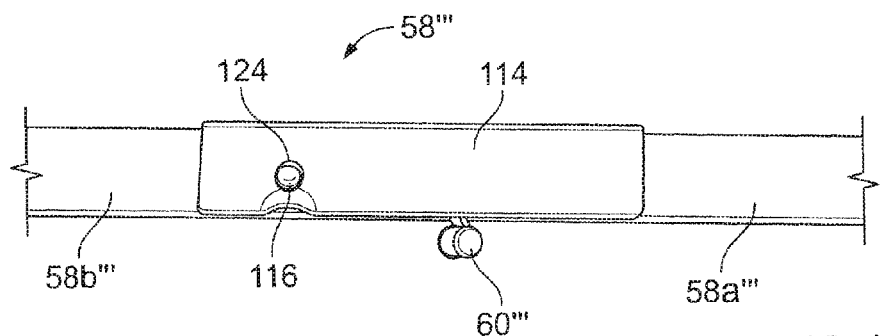
FIG. 10B is a fragmentary top view similar to FIG. 10A showing the linking arm in a fully unfolded and locked state.
Figure 10C:
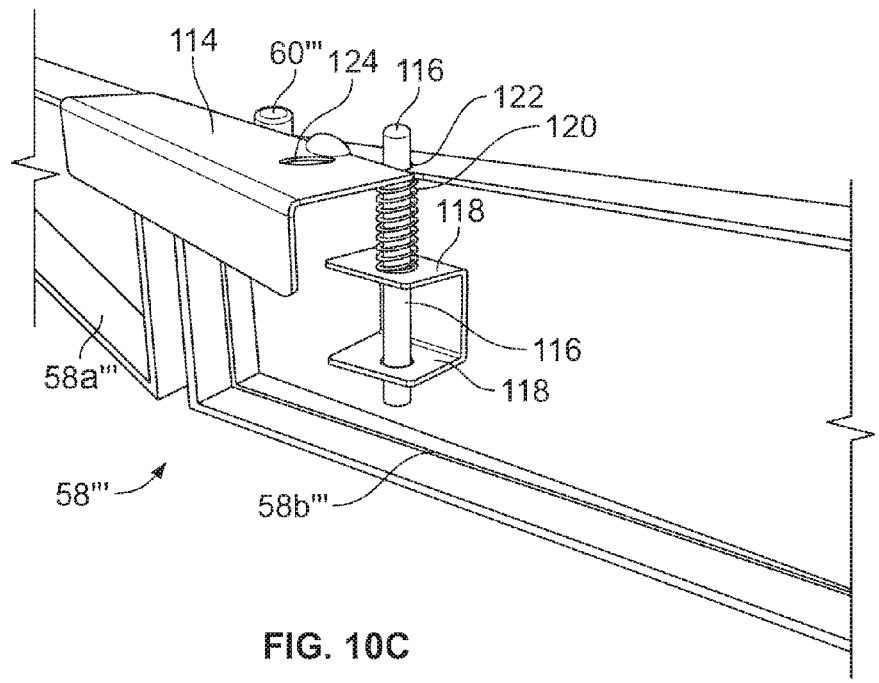
FIG. 10C is a fragmentary perspective view from the rear side of the partially unfolded linking arm shown in FIG. 10A.
Figure 10D:
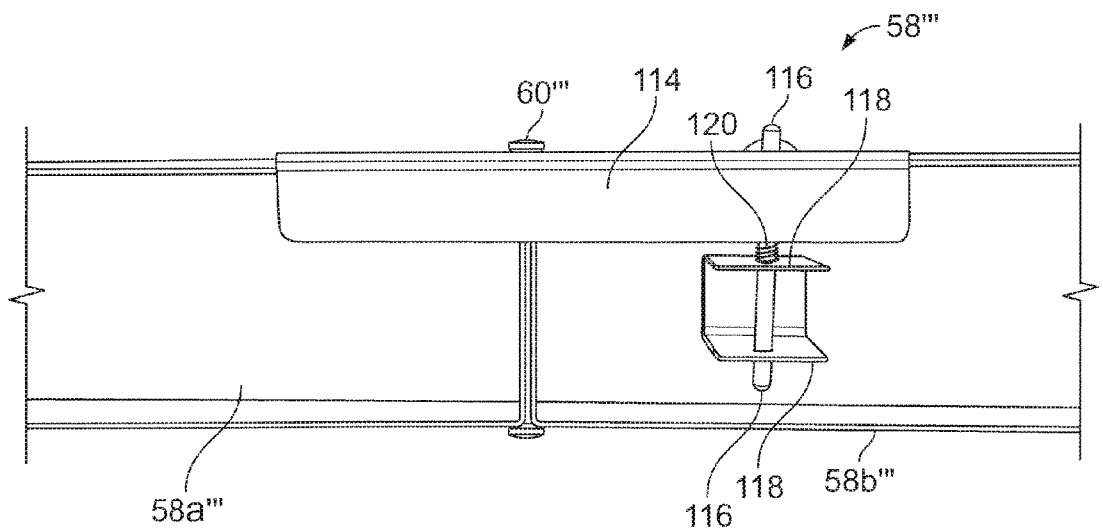
FIG. 10D is a fragmentary rear view of the fully unfolded and locked linking arm shown in FIG. 10B.

An alternative embodiment of the folding shelf design of FIGS. 7A-7B is shown in FIGS. 9A-9C. In this embodiment, the front support assembly 18" has legs 48" held in spaced-apart relationship by upper and lower cross-members 54" and 56", which can be spot-welded in place, and the rear support assembly 20" has legs 52" held in spaced-apart relationship by a rear louvered panel 98 that has been pre-inserted with fasteners (not shown). The two support assemblies are interconnected by linking arms 58", each of which has a hinge 60" in its mid-portion dividing it into linking arm portions 58a" and 58b", and the opposite ends of each linking arm portion are pivotally connected to opposing legs of the support assemblies. Each linking arm includes a locking mechanism near the hinge similar to FIGS. 3A-3C and FIGS. 8A-8C. A bottom shelf 94" with a relatively large circular opening 96" for a supply tank is pivotally connected to the rear panel as by hinges (not shown), and visible through the opening are louvered side panels 100 with hand openings 102 that are pivotally connected to each side edge of the bottom shelf by hinges 104 (FIG. 9B). As in the embodiment of FIGS. 7A-7B, this allows the bottom shelf with its two side panels to be folded substantially into the rear support assembly for compactness when the two support assemblies are folded together for shipping. After the support assemblies are unfolded and the linking arms are locked in position, the assembler can fold the bottom shelf down into position and secure it by fasteners (not shown) to the lower cross-member or the legs of the front support assembly. The side panels can then be pivoted into position between opposing legs of the front and rear support assemblies and fastened in place as by fasteners 68. Castors 106 are installed in the bottoms of the legs, and as shown in FIG. 9C, a pair of hinged doors 108 with handles 110 can be installed on brackets 112 on the front to complete the cart assembly. A firebox assembly (not shown) can then be mounted on top of the cart assembly.

An alternative embodiment of a linking arm 58''' with a locking mechanism that can serve as a permanent structural support for a cart assembly is shown in FIGS. 10A-10D. As with the other linking arms described previously, a hinge 60''' in the mid-portion of the linking arm divides it into first and second linking arm portions 58a''' and 58b'''. In this case, each linking arm portion is formed as a channel with end walls from steel or other suitable structural material. The two linking arms portions are pivotally connected at their outer end walls to opposing legs of two support assemblies (not shown) and the inner end walls of the two linking arm portions abut at the hinge 60'''. A locking arm 114 in the form of an angle member, also formed of steel or other suitable structural material, is permanently attached to the upper surface of the first linking arm portion 58a''', as by spot welding, so that the angle member extends beyond the inner end wall of the first linking arm portion and overlaps the second linking arm portion 58b''' when the linking arm is fully unfolded. The second linking arm portion 58b''' has a slidable locking pin 116 mounted in a U-shaped bracket 118 that is permanently attached, as by spot welding, to the inside wall of the second linking arm portion. A bias spring 120 is sandwiched between the top of the U-shaped bracket and a collar on the locking pin (not shown), biasing the upper end of the locking pin so that it extends through a hole 122 formed in the upper surface of the second linking arm portion. A like hole 124 is formed in the upper surface of the locking arm on the first linking arm extension, positioned to receive the locking pin when the linking arm is fully unfolded. The leading edge of the locking arm is raised where it engages the locking pin to allow it to pass underneath the locking arm and enter the hole. In this manner, the first and second linking arm portions can be securely locked together in the fully unfolded state so that they may serve as structural support members of the cart assembly and avoid the use of additional structural members in lieu of the linking arm.

Figure 11:
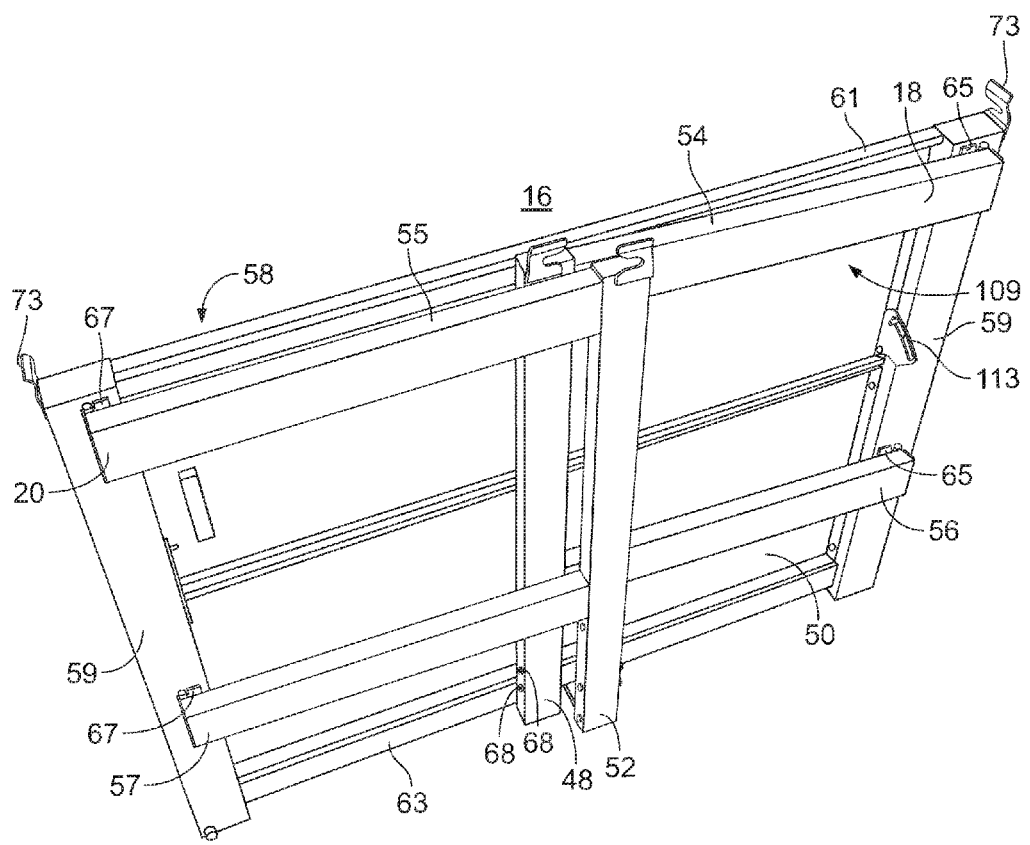
FIG. 11 shows a pair of support assemblies and linking member for a cart assembly folded together for shipping.

Alternatively, as seen in FIG. 11, the two support assemblies 18 and 20 are both side support assemblies and may be partially pre-assembled by interconnecting them with a linking member 58. As further seen in FIG. 11, linking member 58 may be constructed in a manner similar to first and second support assemblies 18 and 20 so that the linking member is a third support assembly comprising a pair of legs 59 held in spaced-apart relationship by upper and lower cross-members 61 and 63, respectively, and which can be spot-welded in place so that the linking member 58 serves as a permanent structural support for the cart assembly. As shown, a front panel 50 and/or a hinged door 109 can be preinstalled on the linking member 58.

In this embodiment, one leg 52 of the first support assembly 18 is omitted so that hinges 65 connect one end of the linking member 58 to the upper and lower cross-members 54 and 56, respectively, of the first support assembly 18 and one leg 52 of the second support assembly 20 is omitted so that hinges 67 connect a second end of linking member 58 to the upper and lower cross-members 55 and 57, respectively, of the second support assembly 20. As a result, first and second support assemblies 18 and 20 are capable of folding inwardly about hinges 65 and 67 to an unassembled configuration with little or no separation between them and linking member 58, thus minimizing space in the shipping carton.

Figure 12A:
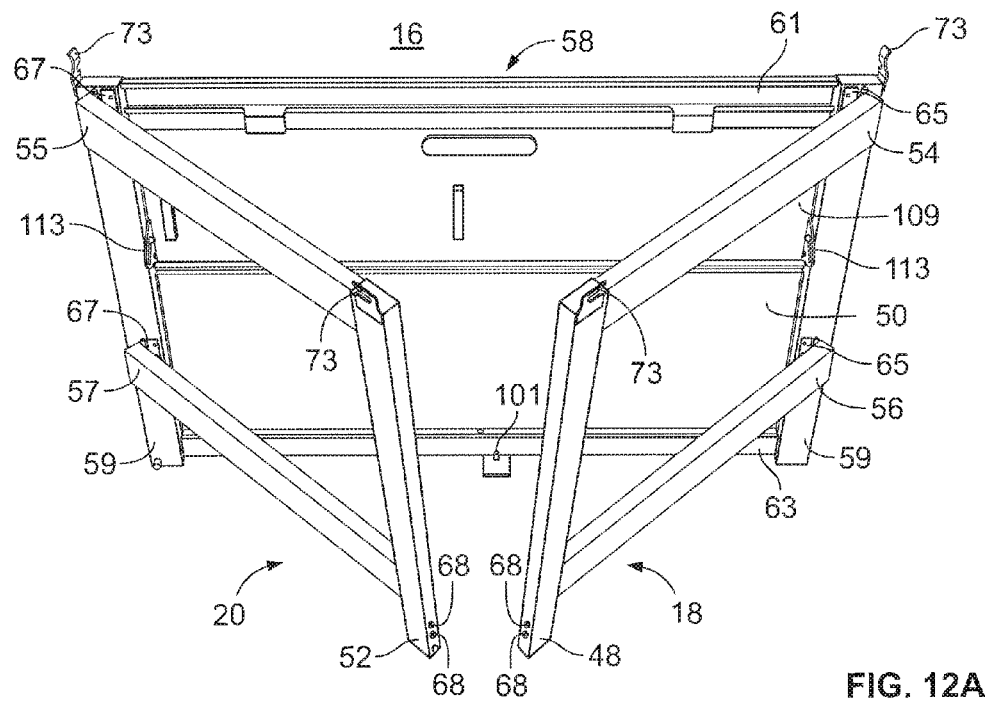
FIG. 12A is a side elevation view of the support assemblies of FIG. 11 showing a linking member joining the support assemblies together in a partially folded state.
Figure 12B:
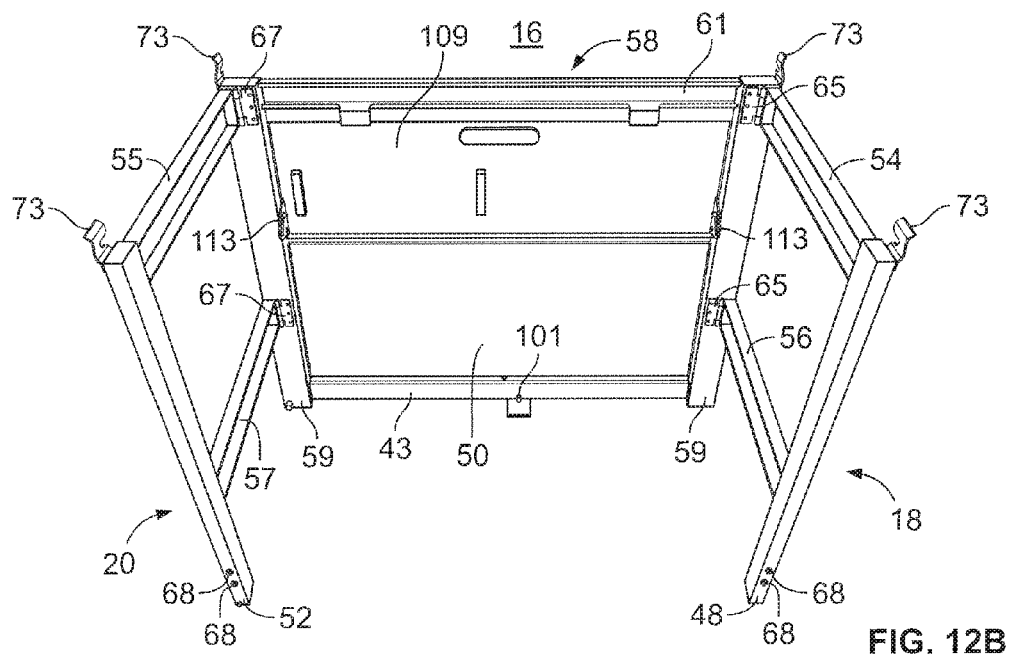
FIG. 12B is a side elevation view of the support assemblies and the linking member shown in FIG. 12A in the fully unfolded state.

FIGS. 12A and 12B are front elevated views of the support assemblies 18 and 20 pre-assembled by interconnecting them with the linking member 58 as shown in FIG. 11. When removed from the shipping carton, side support assemblies 18 and 20 can be unfolded as shown in FIG. 12A and positioned in approximately the proper position for further assembly of the grill as shown in FIG. 12B.

FIG. 12C shows a preferred embodiment having a bottom support assembly 95 pivotally attached to the cross-member 22 by hinges 97. Once the cross-member is attached to the legs 48 and 52 using fasteners 68, the bottom support assembly 95 is unfolded about hinges 97 and attached to the cross-member 63 of the linking member 58 using preinstalled bolt 101 and matching fly nut 103. As shown, the bottom support assembly can include a support bracket 99 for holding a supply tank (not pictured).

Alternatively, as shown in FIG. 12C, brackets 73 are permanently pre-attached to, and protrude beyond, the upper ends of each leg 48, 52, and 59. The brackets are positioned and shaped to receive the four threaded fasteners 68 (shown in FIG. 4). The four threaded fasteners 68 are received in the open ends of the corresponding four brackets 73. The firebox assembly can be secured to the cart assembly by tightening the four threaded fasteners 68 following insertion into the openings of the brackets 73.

Figure 13A:
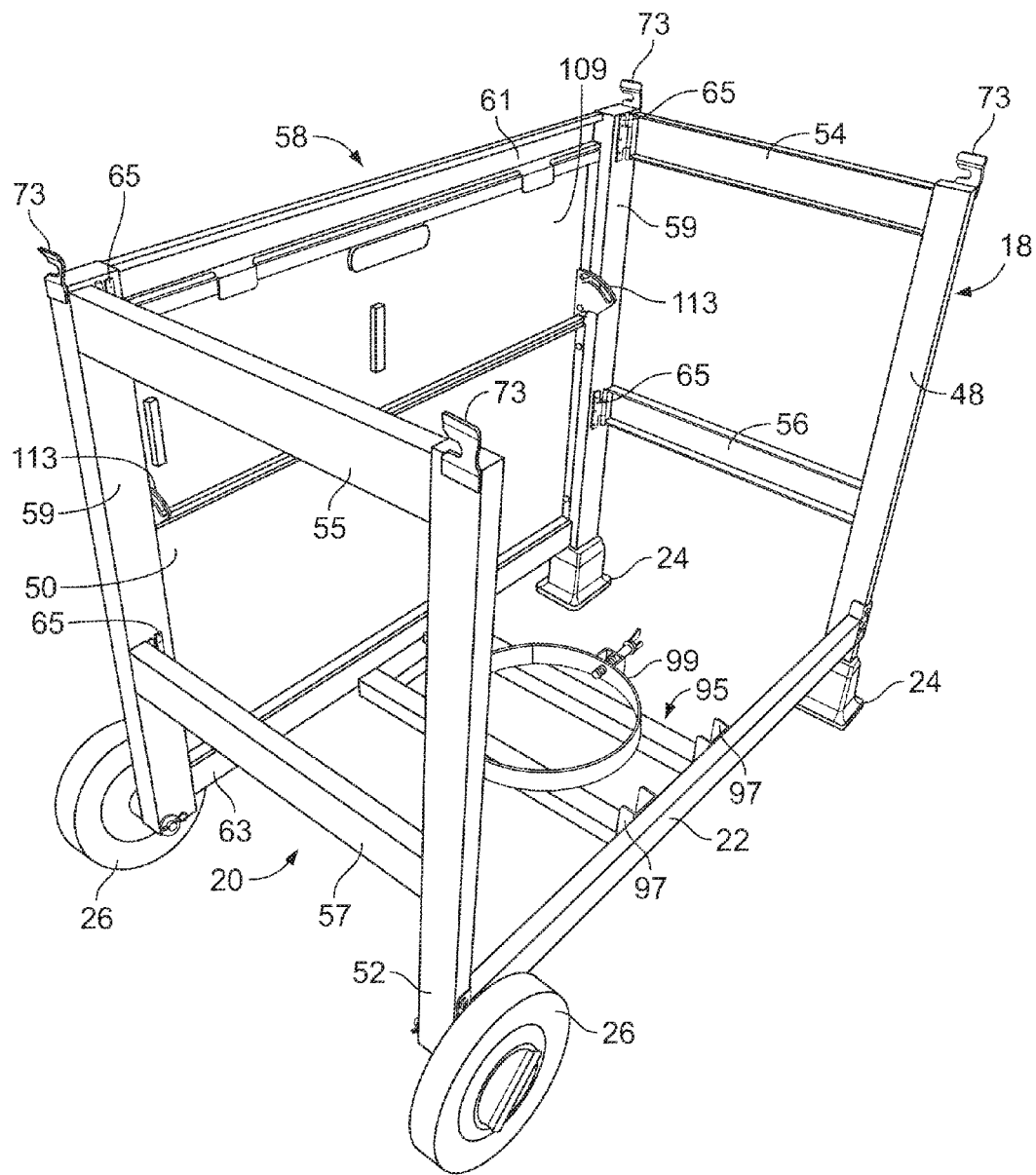
FIG. 13A is a perspective view of the cart assembly shown in FIG. 12C with the bottom support assembly attached to the linking member and where a hinged door installed on the linking member is in the closed position.
Figure 13B:
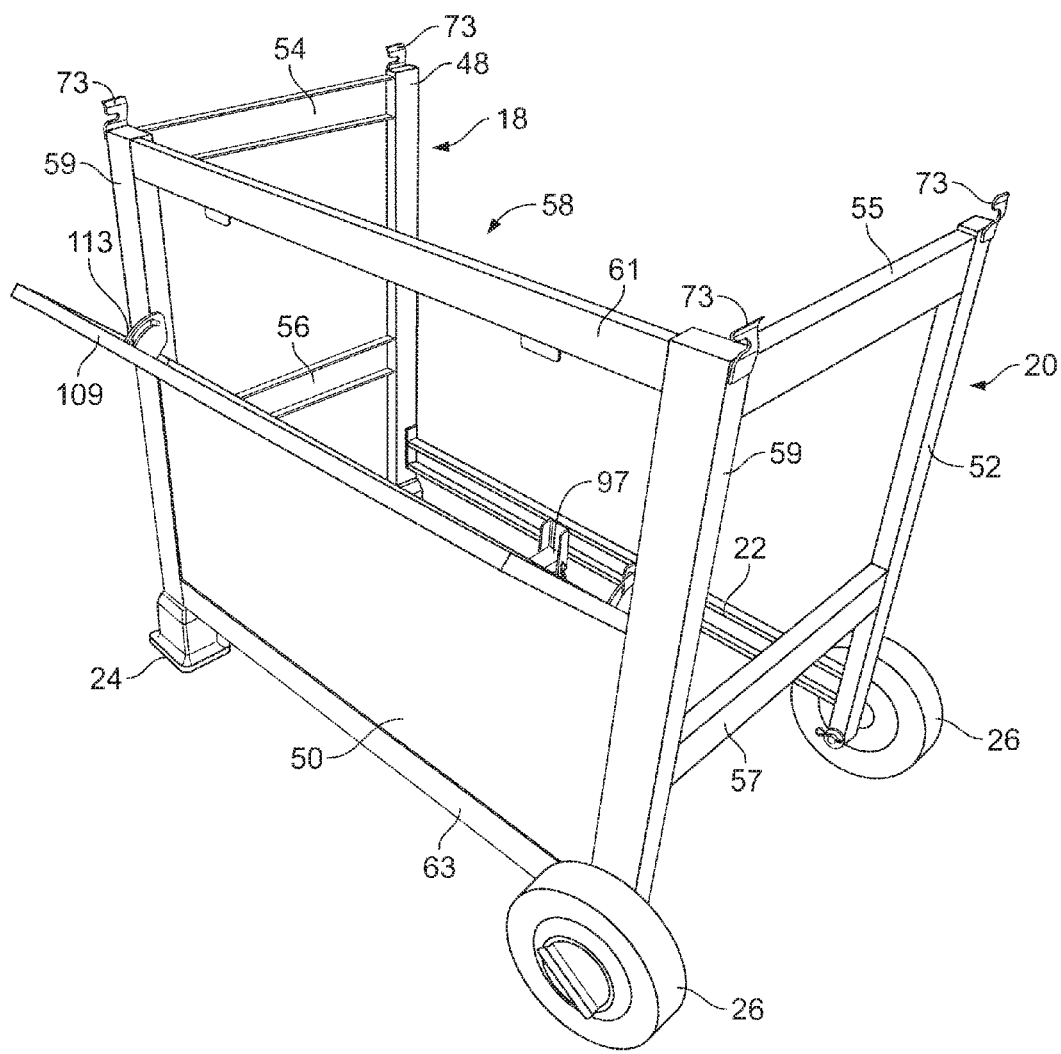
FIG. 13B is another a perspective view of the cart assembly shown in FIG. 13A where the hinged door on the linking member is in the open position.

An alternative embodiment of the design of FIG. 9C is shown in FIGS. 13A and 13B. In this embodiment, the linking member 58 has legs 59 held in spaced-apart relationship by upper and lower cross-members 61 and 63 as shown in FIGS. 11, 12A-12C. A hinged door 109 is pivotally pre-attached to the linking member 58 using hinged brackets 113 that are attached to legs 59. As shown in FIG. 13B, the hinged door 109 can be pivoted about hinged brackets 113 to an open position to allow access to the supply tank and other components (not shown) that are otherwise concealed when the hinged door is in the closed position. A front panel 50 is also pre-attached to the legs 59 and/or bottom cross-member 63 of the linking member 58 with fasteners (not shown). Wheels 26 can be attached to the bottoms of the legs 52 and 59 and feet 24 can be attached to the bottoms of legs 48 and 59. A firebox assembly (not shown) can then be mounted on top of the cart assembly.

It will be appreciated that the various embodiments of the invention described above provide a grill having a cart assembly that can be partially pre-assembled using one or more linking arms, shipped in a folded configuration, and then quickly unfolded and held in the proper position while an assembler, without anyone's assistance, can assemble the cart assembly and mount a firebox assembly to it. Assembly is further simplified by having fasteners partially threaded in place and forming keyholes or slotted openings in components to be attached by those fasteners. The invention thus allows the grill to be shipped compactly yet more quickly and easily assembled at its destination, saving time and labor costs.

The present invention has been described above in terms of presently preferred embodiments so that an understanding of the present invention can be conveyed. However, there are other embodiments not specifically described herein for which the present invention is applicable. Therefore, the present invention should not to be seen as limited to the forms shown, which are illustrative rather than restrictive.

What is claimed is:

1. A method for partially pre-assembling a grill before shipping for quick assembly after removal from a shipping container, the grill comprising a firebox assembly and a cart assembly for supporting the firebox assembly, wherein the firebox assembly comprises a firebox base and a firebox hood pivotally connected to the firebox base, and wherein the cart assembly comprises a first support assembly configured to be joined to the firebox base, a second support assembly configured to be joined to the firebox base, a linking member interconnecting the first and second support assemblies, a first hinge connecting the first support assembly to the linking member, and a second hinge connecting the second support assembly to the linking member, the method comprising the steps of:

interconnecting the first and second support assemblies by the linking member, wherein one end of the linking member is pivotally connected to the first support assembly by the first hinge and a second opposite end of the linking member is pivotally connected to the second support assembly by the second hinge;

folding the first and second support assemblies inwardly horizontally about the first and second hinges respectively to a storage configuration resulting in little or no separation between the first and second support assemblies; and packaging at least the folded cart assembly and the firebox assembly in a shipping container.

2. The method of claim 1, further comprising the step of attaching a side cart panel to at least one support assembly or the linking member.

3. The method of claim 1, further comprising the step of partially inserting at least one threaded fastener into the cart assembly or the firebox assembly before shipping.

4. The method of claim 3, further comprising the step of applying a thread locking compound to the threaded fastener prior to the step of partially inserting the threaded fastener into the cart assembly or the firebox assembly.

5. The method of claim 4, further comprising the step of forming a keyhole opening in a separate grill component to be attached to the cart assembly or the firebox assembly.

6. The method of claim 5, wherein the grill component is a cross-member, the method further comprising the steps of:

pivotally attaching a first end of a bottom support assembly to the cross-member by a hinge; and partially inserting at least one threaded fastener into a second opposite end of the bottom support assembly.

7. A method for assembling a grill configured for quick assembly after removal from a shipping container, the grill comprising a firebox assembly and a cart assembly for supporting the firebox assembly, wherein the firebox assembly comprises a firebox base and a firebox hood pivotally connected to the firebox base, and wherein the cart assembly comprises a first support assembly configured to be joined to the firebox base, a second support assembly configured to be joined to the firebox base, a linking member interconnecting the first and second support assemblies, a first hinge connecting the first support assembly to the linking member, and a second hinge connecting the second support assembly to the linking member, the method comprising the steps of:

removing the firebox assembly and the cart assembly from the shipping container;

unfolding the first and second support assemblies of the cart assembly horizontally about the first and second hinges respectively to convert the cart assembly from an unassembled configuration, in which the first and second support assemblies are folded, to an assembled configuration, in which the first and second support assemblies are unfolded to a position suitable for supporting the firebox assembly; and securing the firebox assembly to the cart assembly.

8. The method of claim 7, further comprising the steps of:

aligning a keyhole opening formed in a grill component to be attached to the grill with a threaded fastener partially pre-inserted into the cart assembly or the firebox assembly, wherein the keyhole opening comprises a larger opening, sized and configured to receive a head of the threaded fastener, and a smaller opening, contiguous with the larger opening, and sized and configured to be slid under the head and around the shaft of a threaded fastener;

sliding the grill component with respect to the grill so that the head of the threaded fastener extends over the smaller opening; and tightening the threaded fastener.

9. The method of claim 7, further comprising the steps of:

aligning a first keyhole opening formed in a first end of a cross-member over a first treaded fastener partially preinserted into the first support assembly, aligning a second keyhole opening formed in a second opposite end of the cross-member over a second threaded fastener partially pre-inserted into the second support assembly, sliding the cross-member so that the first and second threaded fasteners in the first and second support assemblies extend over the respective first and second keyhole openings of the first and second ends of the cross-member, and tightening the threaded fasteners.

10. The method of claim 9, wherein the cross-member is pre-attached to the first end of a bottom support assembly by a hinge, the method further comprising the steps of:

unfolding the bottom support assembly so that at least one threaded fastener preinserted into a second opposite end of the bottom support assembly aligns with an aperture in the linking member, and tightening the at least one threaded fastener.

* * * * *